(12) United States Patent
Palmer et al.

(10) Patent No.: US 8,631,021 B2
(45) Date of Patent: Jan. 14, 2014

(54) SYSTEMS AND METHODS FOR MANAGING ORGANIZATIONAL INFORMATION

(75) Inventors: Bradley James Francis Palmer, Surrey (CA); Alexander Szibbo, Vernon (CA)

(73) Assignee: Jostle Corporation (CA)

( * ) Notice: Subject to any disclaimer, the term of this patent is extended or adjusted under 35 U.S.C. 154(b) by 0 days.

(21) Appl. No.: 13/121,181

(22) PCT Filed: Mar. 26, 2010

(86) PCT No.: PCT/IB2010/000904
§ 371 (c)(1),
(2), (4) Date: Mar. 25, 2011

(87) PCT Pub. No.: WO2010/109331
PCT Pub. Date: Sep. 30, 2010

(65) Prior Publication Data
US 2011/0184962 A1  Jul. 28, 2011

Related U.S. Application Data

(60) Provisional application No. 61/211,050, filed on Mar. 26, 2009.

(51) Int. Cl.
*G06F 7/00* (2006.01)
*G06F 17/30* (2006.01)

(52) U.S. Cl.
CPC .. *G06F 7/00* (2013.01); *G06F 17/30* (2013.01)
USPC ........................................................ 707/754

(58) Field of Classification Search
None
See application file for complete search history.

(56) References Cited

U.S. PATENT DOCUMENTS

| | | | |
|---|---|---|---|
| 6,895,403 B2* | 5/2005 | Cardwell et al. | 707/758 |
| 2004/0215610 A1* | 10/2004 | Dixon et al. | 707/3 |
| 2004/0267593 A1* | 12/2004 | Sammons et al. | 705/9 |
| 2006/0155750 A1* | 7/2006 | Fowler et al. | 707/102 |
| 2008/0091441 A1* | 4/2008 | Flammer et al. | 705/1 |
| 2009/0222298 A1* | 9/2009 | Atmaja | 705/7 |
| 2010/0023482 A1* | 1/2010 | Mershon et al. | 707/3 |

FOREIGN PATENT DOCUMENTS

| | | |
|---|---|---|
| CA | 2405020 | 10/2001 |
| CA | 2571425 | 1/2006 |
| CA | 2575176 | 2/2006 |
| CA | 2664905 | 4/2008 |
| KR | 100632252 | 10/2006 |
| WO | 2004095337 | 11/2004 |

OTHER PUBLICATIONS

Gerald Falkowski & Valdis Krebs, "Software Test Community Uncovered using SNA" (APQC, Jun. 5, 2005).

(Continued)

*Primary Examiner* — Jay Morrison
(74) *Attorney, Agent, or Firm* — Westberg Law Offices

(57) ABSTRACT

Novel and useful systems and methods for identifying, organizing and displaying organizational information are provided for multiple users to define organizational relationships associated with an organization. The organizational relationships are included in a set of organizational relationships and stored as organizational data in a computer-readable medium for future access. The organizational data is used for a variety of purposes, such as generating visual depictions of the organizational relationships.

38 Claims, 27 Drawing Sheets

(56) References Cited

OTHER PUBLICATIONS

Renato Balancieri, Roberta Cuel & Roberto Carlos dos Santos Pacheco, "Social Network Analysis for Innovation and Coordination", Proceedings of I-KNOW '07, The Seventh International Conference on Knowledge Management, Held Sep. 5-7, 2007, in Graz, Austria (Graz:KnowCenter, Sep. 2007).

Willem-Olaf Huijsen, Samuel Driessen & Dion Dlijp, "ExpertFinder: Collaborative Expertise Localization", Proceedings of I-KNOW '07, The Seventh International Conference on Knowledge Management, Held Sep. 5-7, 2007.

Dorit Nevo, Izak Benbasat & Yair Wand, "Who Knows What?", Executive Adviser (MIT Sloan Management Review/Wall Street Journal, Oct. 20, 2009), online: Who Knows What?-Executive Adviser an MIT SMR/ Wall Street Journal Collaboration—MIT Sloan Management Review.

Rob Cross, Nitin Nohria & Andrew Parker, "Six Myths About Informal Neworks—and How to Overcome Them", MIT Sloan Management Review 43:3 (Massachusetts Institute of Technology, Apr. 15, 2002).

* cited by examiner

Contributors — 1401

| Contributor ID | Name | Membership |
|---|---|---|
| 1406C | Jim Green | External |
| 1408C | Drew Ahmed | Internal |
| 1412C | Martine Kumar | Internal |
| 1424C | Bob Smith | Internal |
| 1434C | Clara Ida | Internal |
| 1438C | Jan Man | Internal |

Roles — 1403

| Role ID | Name | Filled By |
|---|---|---|
| 1404R | Attorney | 1406C |
| 1410R | Board Member | 1412C |
| 1414R | Board Member | 1408C |
| 1418R | Chairman | 1424C |
| 1422R | CEO | 1424C |
| 1426R | VP Products | 1434C |
| 1432R | VP Marketing | 1438C |

Teams — 1405

| Team ID | Name |
|---|---|
| 1442T | New Products |

FIG. 14A

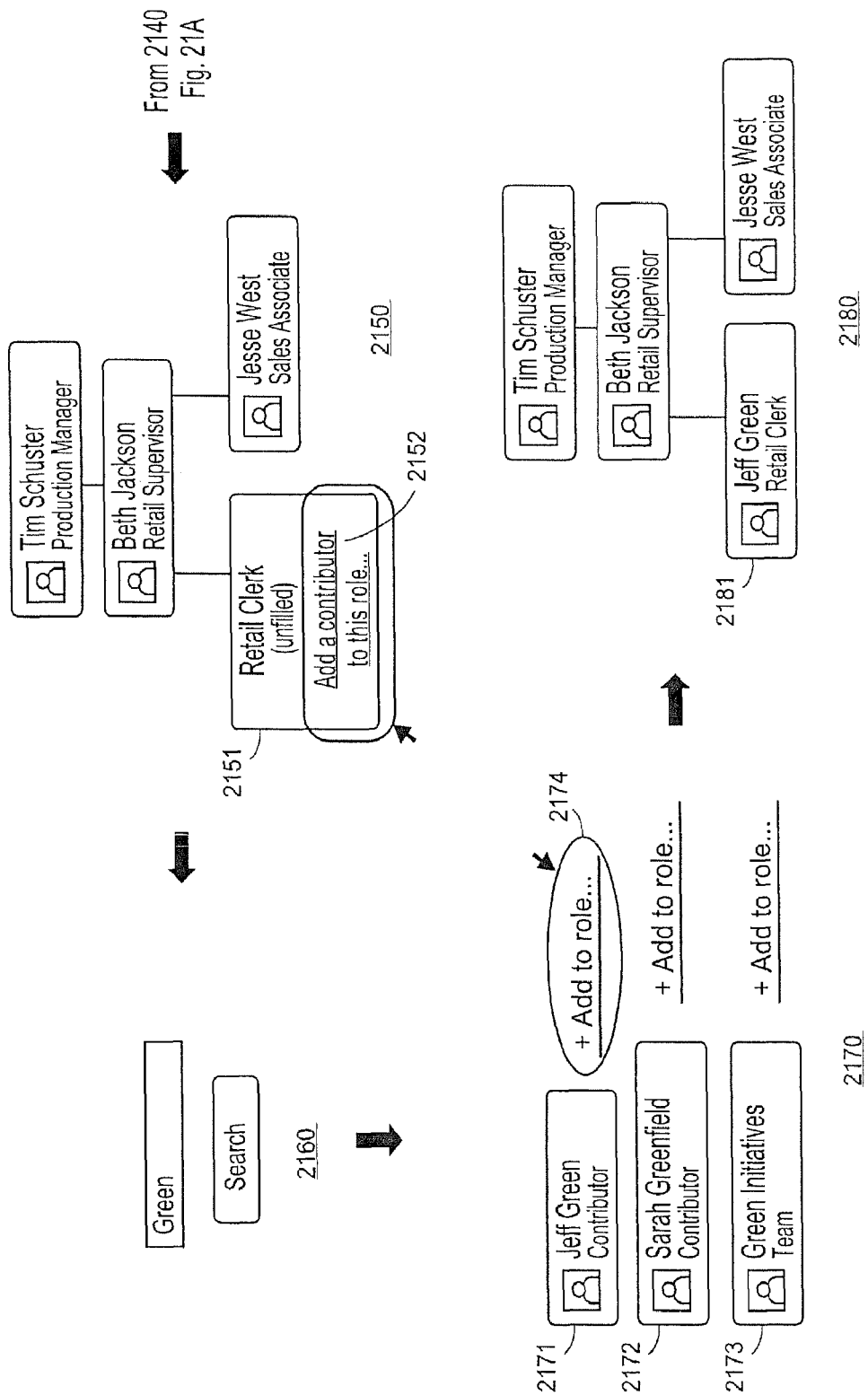

SYSTEMS AND METHODS FOR MANAGING ORGANIZATIONAL INFORMATION

RELATED APPLICATIONS

This application claims the benefit of U.S. Provisional Application No. 61/211,050, filed Mar. 26, 2009, the disclosure of which is incorporated by reference herein.

BACKGROUND

The invention relates generally to the field of organizational information and, more particularly, to an approach for identifying, organizing, displaying, and utilizing the roles, people, and relationships that exist in an organization.

Humans organize themselves into cooperative groups and organizations such as companies, joint ventures, partnerships, trusts, project teams, human families, clubs, unions, societies, political parties, governments, charitable organizations, and armies. Whether of a personal, professional, or political nature, each such organization involves contributors who are affiliated with the organization by birth, invitation, employment, or voluntary involvement. Contributors occupy various roles in the governance, management, operations, and administration of the organization.

The roles and the contributors who occupy them interact with each other within the context of relationships. These relationships, whether formally defined as part of an established hierarchy or informally agreed upon based on a pattern of interactions, involve delegation of activities and tasks that are undertaken on behalf of the organization. The activities and tasks may be assigned to and/or performed by a contributor based on their role within the organization or their particular skill set or qualifications. People may be affiliated with an organization as members or as external contributors, and their designated role may reflect this status. For example, a member of a company may be a manager or an officer while an external contributor may be an independent contractor or a consultant.

In each such organization, there is a need to organize and visualize the various contributors, roles, and relationships to ensure efficiency in the organization's operations and management. To this end, organizations typically create and use hierarchical organization charts and trees containing visual depictions. Organizations may also create and use various other types of depictions of themselves in the form of relationship diagrams, task descriptions, project plans and other similar graphical and illustrative views, apart from organization charts and family trees. In some organizations, these tools are designed by a central authority within the organization to which such work has been expressly assigned either as an ongoing role or as a one-time task. In other organizations, the task of creating these tools is dispersed to the various groups, departments, and divisions within the organization, each of which creates and maintains a semi-independent visualization of its own group, department, or division. In either case, a diagrammer or diagrammers typically administer a top-down process of creating visualizations depicting the relationships that comprise an entire organization, group, department, or division.

Although the top-down nature of such processes is intended to ensure structural consistency and design efficiency, such currently used tools and approaches result in visualizations that are often flawed in various respects. Moreover, recent developments in law, technology, and commerce have highlighted the deficiencies of existing approaches to modeling organizational relationships and further diminished their utility. Organizations are now facing new demands on how they build their cultures, how they collect and make available information relating to their hierarchy and management structure, and how they ensure the well-being and safety of their contributors. Regulatory and other legal requirements relating to the governance and internal control processes employed by organizations have increased significantly in recent years. In addition, organizations are facing new pressures and opportunities to form external collaborations, to foster internal collaboration or mentorship, to outsource work and operate globally, and to utilize new technologies for communication inside and outside the organization.

One flaw in visualizations produced by current methods is that the visualization content may be incomplete or inaccurate, either as to the displayed contributors, which displayed relationships are shown, or what displayed attributes are part of the visualization. This may result from the diagrammer not having access to or not receiving all the necessary input information, since in many cases only the internal contributors themselves know or have access to such input information but do not communicate it to the diagrammer. This problem is amplified by the top-down nature of the current methods of creating and maintaining visualizations, which in some cases deters internal contributors from either noticing or communicating errors in their personal relationships and data. Current visualization processes typically do not provide an easy way to verify individual relationships and data through the individuals directly involved or to document their validation within the visualizations.

In other instances, visualizations that may have been correct at the time they were created by the diagrammer shortly thereafter become, and remain, out of date as to the displayed contributors, relationships or attributes. This is due to the dynamic nature of every organization, with its changing internal contributors, the assignment of internal contributors to new positions or roles, and the projects and tasks of internal contributors being revised, newly implemented or terminated by the organization. When the ongoing maintenance or administration of the visualizations is assigned to one or a few individuals as the diagrammer(s), the accuracy of a visualization becomes subject to a diagrammer's ability to update, and/or a diagrammer's personal assumptions as to when and to what degree the visualization should be updated. Moreover, even when a human resources database is used to help capture input information for each internal contributor and to speed up visualization updates, it is often difficult for the diagrammer to stay informed with regard to informal changes and evolution in roles, relationships, responsibilities, and attributes within an internal contributor team or a group making up part of the whole organization. This is particularly true when such changes occur locally within a given working team. Also, even when a visualization is updated, it is difficult to determine which particular version or update of the visualization is complete and accurate during which period of time.

Another flaw of current, top-down procedures for creating visualizations is that they provide contributors with few or no options to specify and update the content of their own node or profile within the visualization. In addition to organizational information attributes that are standard and mandatory (e.g., company phone extension, company email address, office number, etc.), many contributors may wish to provide non-organizational attributes to make themselves more accessible and ease collaboration among contributors. For instance, a contributor may wish to provide personal contact attributes such as mobile phone numbers, links to profiles on social networking sites, and usernames on instant messaging systems, most of which are outside the control of the organization. This flaw has become more pressing as organizations increasingly have or interact with contributors who are mobile, working from home offices, remote locations and the like.

Still another deficiency or limitation in the visualizations produced by current methods is that they do not identify or provide information about the many relationships that an internal contributor may have with external contributors. Examples of such external contributors include collaborators on projects that are not part of the organization's core activities, service providers and suppliers that contribute to the organization's activities and operations, caretakers, professional advisors, and consultants. Since external contributors and/or their relationships with each internal contributor are often not listed in any formal database or otherwise identified by the organization's records, the diagrammer has little or no input information about their existence or nature to incorporate into the visualization. Alternatively, the diagrammer may not realize the importance or need for incorporating within the visualization the external contributors and their relationships with the organization's internal contributors, since the diagrammer does not know about and/or participate directly in such relationships.

An example of a visualization created by current, top-down approaches is illustrated in FIG. 1. The visualization may be drawn by a diagrammer using a drawing program or similar tool. The example of FIG. 1 includes an external consultant 110 and a "dotted line" relationship 102. The dotted line relationship 102 conveys that contributor Jan Man is a secondary supervisor to contributor Amy King in addition to her primary supervisor Clara Ida. To create such a chart, the diagrammer would have to be informed of, and manually add to the chart, both the relationship 102 and the contributions of the external consultant 110. The diagrammer would need to be aware of a relationship 104 between a coordinator 108 and the external consultant 110, even though the coordinator 108 actually supports many individuals in the organization and does not report to individual 106 from a human resources administration point of view. Moreover, the diagrammer would need to be aware and conscious of the subtle differences between seemingly similar internal relationships such as Clara Ida's primary supervisory relationship with Amy King and Jan Man's secondary supervisory relationship 102 with Amy King.

For these reasons, there is a need for an approach to managing organizational information that retains the advantages of the top-down design process while addressing the disadvantages of that process.

BRIEF DESCRIPTION OF THE DRAWINGS

Similar reference numbers are used throughout the figures to reference like components and/or features.

FIG. 14A depicts an example set of nodes representing organizational data and their associated attributes according to an embodiment.

FIGS. 21A and 21B depict a series of screenshots of an example user interface within which a user manages organizational relationships by executing a number of operations.

DETAILED DESCRIPTION

Figure 1:
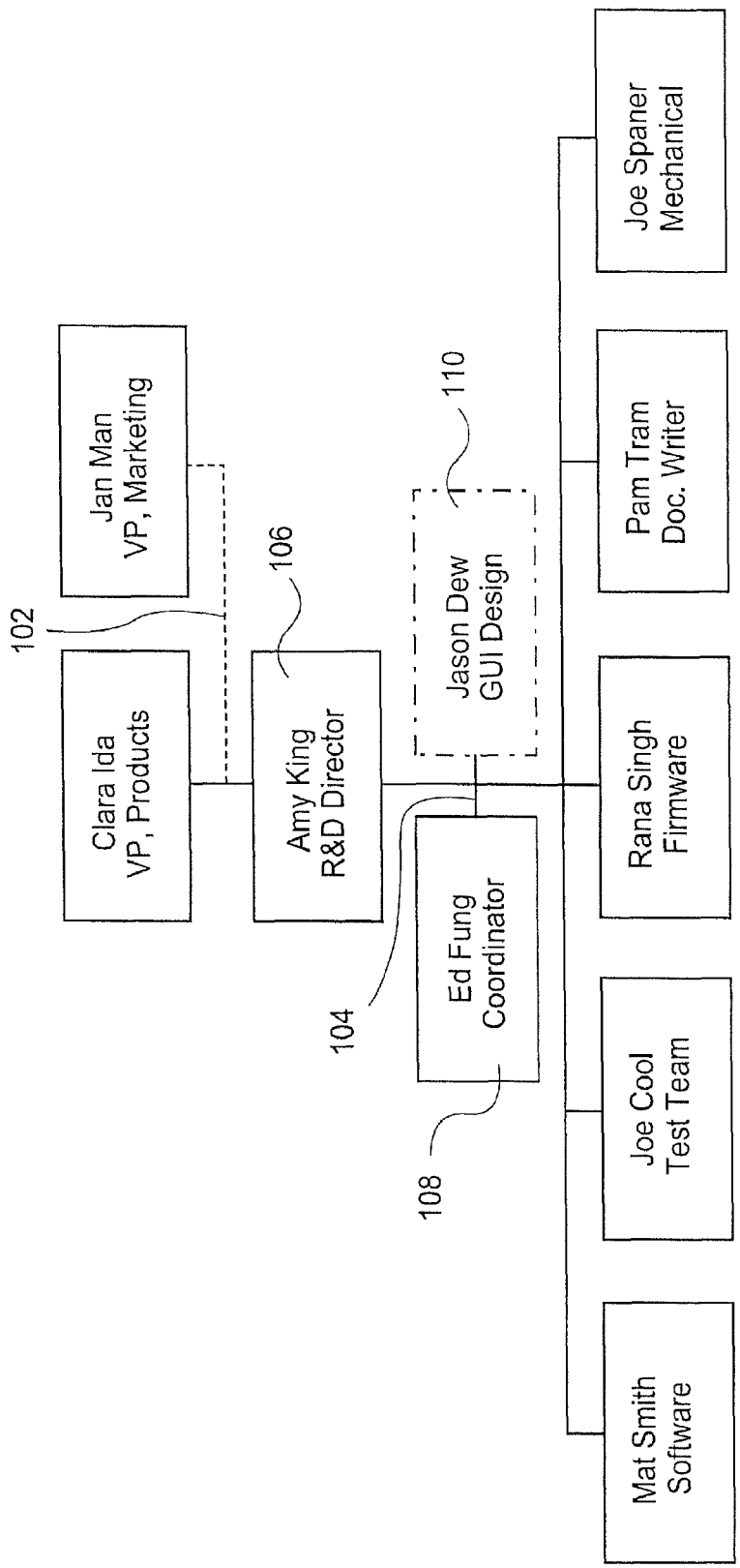
FIG. 1 depicts an example visualization created according to top-down approaches.

The embodiments discussed herein relate generally to systems and methods for identifying, organizing and displaying various organizational relationships. The invention may be applied to the relationships of an organization of any size, complexity, or purpose. The exemplary embodiments are provided to illustrate the invention and should not be construed as limiting its scope.

In the following disclosure, numerous specific details are set forth to provide a thorough understanding of the invention. However, those skilled in the art will appreciate that the invention may be practiced without such specific details. In other instances, well-known elements have been illustrated in schematic or block diagram form in order not to obscure the invention in unnecessary detail. Additionally, for the most part, details concerning network communications, data structures, and the like have been omitted inasmuch as such details are not considered necessary to obtain a complete understanding of the invention, and are considered to be within the understanding of persons of ordinary skill in the relevant art. It is further noted that all functions described herein may be performed in either hardware or software, or a combination thereof, unless indicated otherwise. Certain terms are used throughout the following description and claims to refer to particular system components. As one skilled in the art will appreciate, components may be referred to by different names. This document does not intend to distinguish between components that differ in name, but not function. In the following discussion and in the claims, the terms "including", "comprising", and "incorporating" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections.

The invention offers a number of advantages over the prior art. As described in the foregoing discussion, present approaches to identifying, organizing, and displaying organizational relationships have a number of significant disadvantages stemming from their top-down nature. However, some aspect of top-down or distributed administration is necessary to ensure the consistency and coherence of data and visualizations. Thus, in order to retain the advantages of top-down techniques without succumbing to their drawbacks, the present approach is implemented as a computerized framework within which individual contributors can create and manage profiles and relationships between contributors, roles, and teams. A user may edit a profile corresponding to their, or to another contributor, role or team, and manage relationships within the organization involving their, or other contributors, roles and teams in accordance with their seniority or position within the organization. The data entered by contributors is stored, for example, in a computer-readable medium and used to create a visual depiction of the contributors, roles, teams, and relationships associated with an organization. The visual depiction may include profiles and relationships corresponding to the contributors of an organization. Alternatively, the profiles and relationships may correspond to roles and may be viewed and managed independently of the contributors who occupy them. The visual depiction may further include teams represented as a collection of profiles corresponding to the contributors and/or roles that describe a team or as a single profile corresponding to an entire team. The visual depiction may also include visual indicators of various attributes associated with the contributor, role, team, or relationship. In various embodiments, contributors may view profiles and relationships based on user types, such that a contributor's user type determines which profiles and relationships they are permitted to see. In other embodiments, a contributor may filter which profiles and relationships they see by setting a preference attribute. The exemplary embodiments are described in further detail below.

Figure 2:
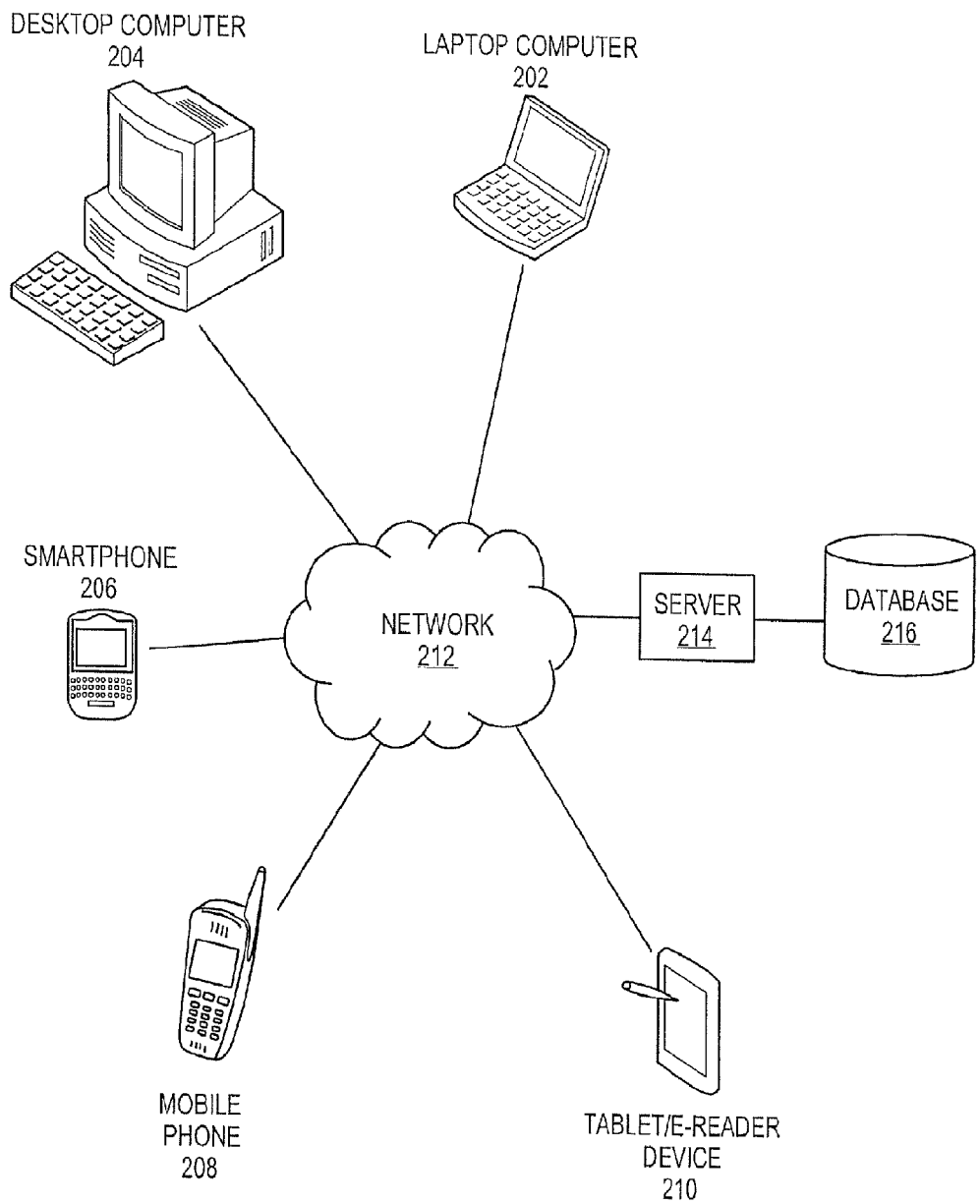
FIG. 2 depicts an example computing environment in which the systems and methods discussed herein are implemented.

An exemplary computing environment 200 within which the invention is implemented is illustrated in FIG. 2. A server 214 configured to access a database 216 is connected to a data communication network 212, such as a local area network (LAN), wide area network (WAN), or the Internet. Multiple devices including, but not limited to, a laptop computer 202, a desktop computer 204, a smartphone 206, a mobile phone 208, and a tablet or e-reader device 210 are configured to communicate with the server 214 via the data communication network 212. In operation, the devices 202-210 send commands to the server 214 in response to which the server creates organizational data representing roles, contributors, teams, and relationships and stores the organizational data in the database 216. In other operations, performed separately or in parallel, the server 214 retrieves the organizational data from the database 216 and sends it to the devices 202-210 via the data communication network 212. The devices 202-210 use the organizational data to perform various functions, such as to create visual depictions illustrating roles, contributors, teams, and relationships. One or more of the devices 202-216 may be configured to implement the invention within a cloud computing environment.

Figure 3:
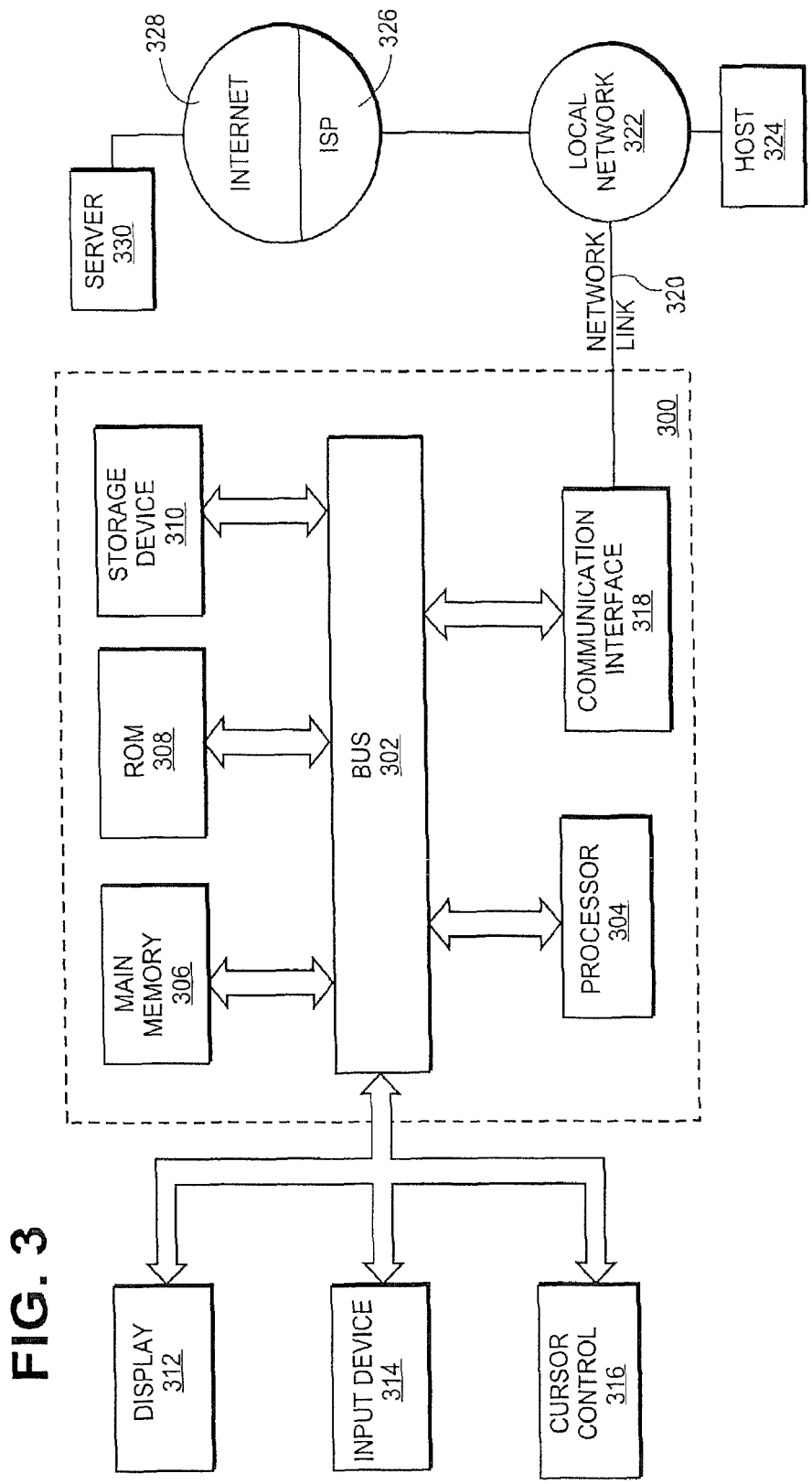
FIG. 3 depicts an example computer system configured to perform the methods described herein according to an embodiment.
Figure 4:
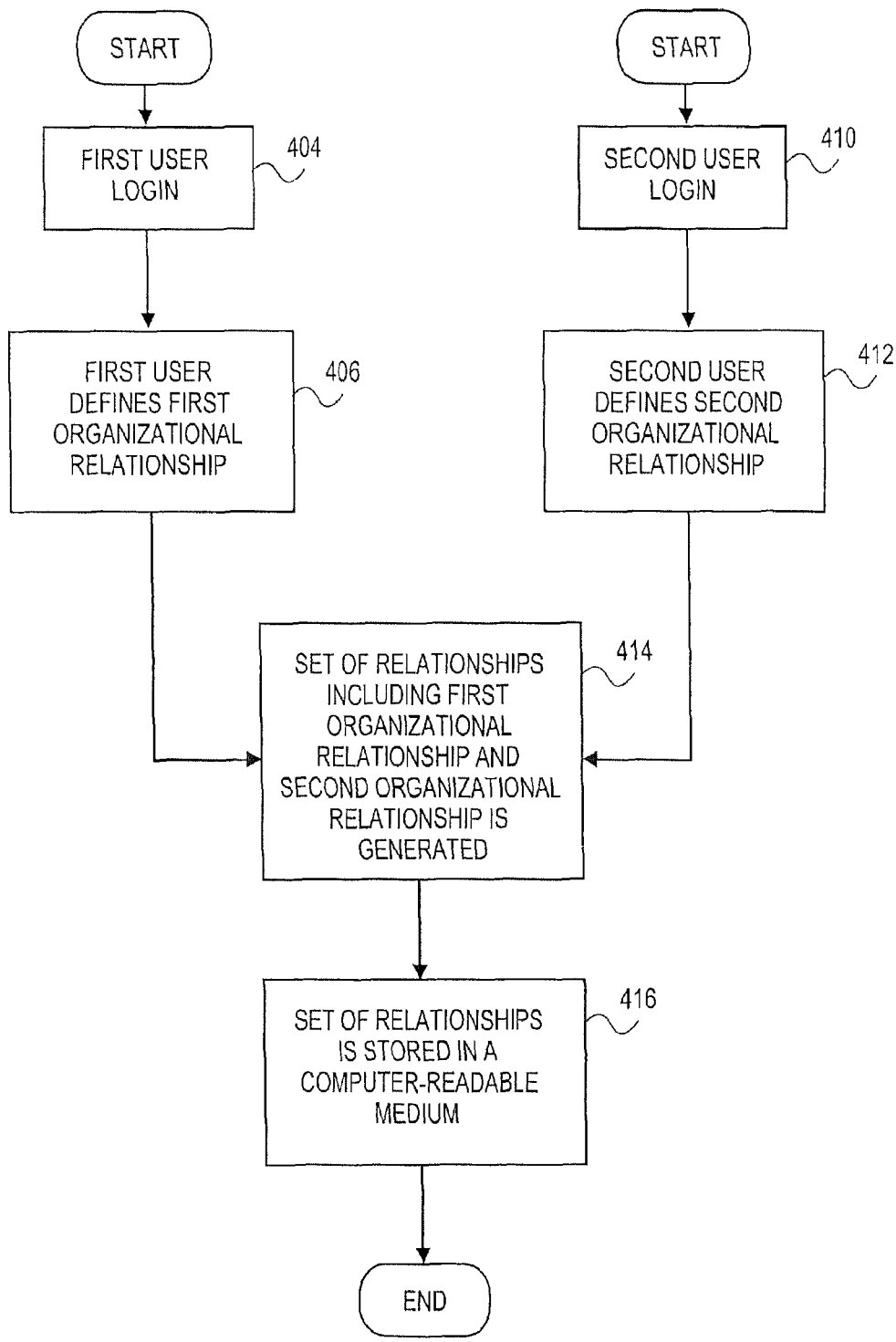
FIG. 4 depicts a block diagram illustrating an example procedure for defining and aggregating organizational relationships according to an embodiment.

Referring to FIG. 3, a diagrammatic view of an example computer system 300 configured according to the invention is illustrated. Any one of the devices 202-214 of FIG. 2 may be configured as illustrated in FIG. 3. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), a liquid crystal display (LCD), or an organic light emitting diode (OLED), for displaying information to a computer user. An input device 314, including alphanumeric and other keys, is coupled to bus 302 for communicating information and command selections to processor 304. Another type of user input device is a cursor control 316, such as a mouse, a trackball, a track pad, or cursor direction keys for communicating direction information and command selections to processor 304 and for controlling cursor movement on display 312. The cursor control 316 typically has two degrees of freedom in two axes, a first axis (e.g., x) and a second axis (e.g., y), that allows the device to specify positions in a plane.

The invention is related to the use of computer system 300 for transmitting, receiving, defining, and depicting organizational data representing roles, contributors, teams, and relationships. According to one embodiment of the invention, the transmitting, receiving, defining, and depicting of organizational data is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the procedures described herein. One or more processors in a multi-processing arrangement may also be employed to execute the sequences of instructions contained in main memory 306. In alternative embodiments, hard-wired circuitry may be used in place of, or in combination with, software instructions to implement the invention. Thus, embodiments of the invention are not limited to any specific combination of hardware circuitry and software.

The term "computer-readable medium" as used herein refers to any medium that participates in providing instructions to processor 304 for execution, or that stores any type of information. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires associated with bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a data network using a network interface. A network interface local to computer system 300 can receive the data and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an wireless network interface controller or a cellular radio to provide a data communication connection. As another example, communication interface 318 may be a local area network (LAN) card to provide a data communication connection to a compatible LAN. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the Internet 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In any of the embodiments described herein, a server 330 might transmit data through Internet 328, ISP 326, local network 322 and communication interface 318.

The received instructions may be executed by a processor 304 as they are received, and/or stored in storage device 310, or other non-volatile storage for later execution. In this manner, computer system 300 may obtain data in the form of a carrier wave. The processor 304 may be a specialized or dedicated microprocessor that is configured to perform particular tasks according to the invention, by executing machine-readable software code that defines the particular tasks embodied by the invention.

FIGS. 4, 9, 10, 11, 13, and 20 illustrate example methods that create and manipulate the organizational data representing roles, contributors, teams, and relationships. According to one series of operations illustrated in FIG. 4, a first user logs into a system via a user interface at block 404 and defines a first organizational relationship at block 406. In another series of operations performed separately or in parallel, a second user logs into a system via a user interface at block 410 and defines a second organizational relationship at block 412. A computer system configured according to the invention then generates a set of organizational relationships including the first organizational relationship and the second organizational relationship at block 414 and stores the set of relationships in a computer-readable medium at block 416. Other examples are illustrated in FIGS. 4, 9, 10, 11, 13, and 20 and are discussed in more detail below.

Figure 5:
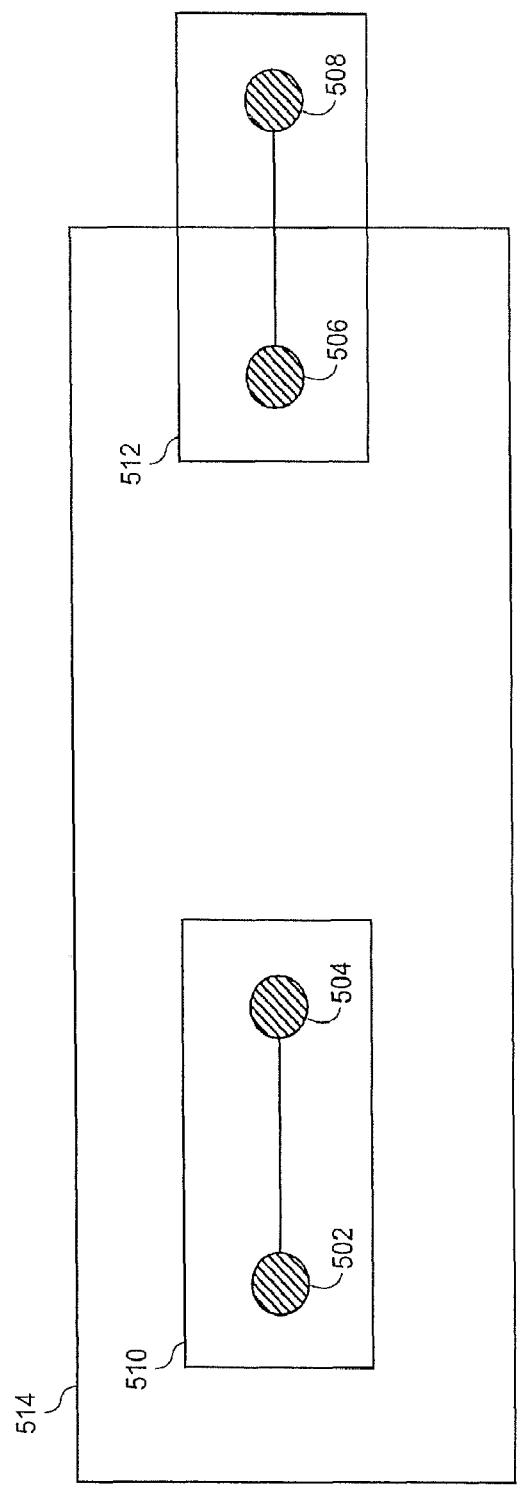
FIG. 5 depicts an example set of organizational relationships between nodes according to an embodiment.

In another series of embodiments, each of the first and second organizational relationships consists of a pair of nodes, such that a node may represent a contributor, a role, a contributor in a role, or a team. Additionally, the nodes may be members or non-members of the organization, i.e., the node may represent a contributor, a role, a contributor in a role, or team that is internal or external to the organization. An example embodiment is illustrated in FIG. 5. In this embodiment, an organization 514 consists of three nodes 502, 504, and 506. A first organizational relationship 510 consists of the nodes 502 and 504 while a second organizational relationship 512 consists of node 506 and a node 508. In this example, node 508 is part of an organizational relationship but is a non-member of the organization 514 because it is external to the organization. In one such embodiment, the contributor, role, and/or team corresponding to a node in the first or second organizational relationship confirms or denies the relationship. In another such embodiment, a user may define a third organizational relationship that includes one node from the first pair of nodes and one node from the second pair of nodes. The third organizational relationship may then be stored in a computer-readable medium.

In another series of embodiments, multiple users may define multiple organizational relationships. A set of organizational relationships including the multiple organizational relationships is generated and stored in a computer-readable medium. In a series of operations performed separately or in parallel, a first user and a second user identify a first subset and a second subset of organizational relationships from the set of organizational relationships, respectively.

According to another series of embodiments, visual depictions are generated from the organizational data representing contributors, roles, teams, and relationships. The visual depictions may include a visual representation of multiple profiles corresponding to multiple nodes and a visual representation of multiple relationships. The profiles may contain various data and contact attributes providing information about the contributor, role, and/or team corresponding to that profile. A data attribute may contain, for example, reference information about a contributor's or a team's skills, activities, project history, office location, team membership, or current assignments. A contact attribute for a contributor or a team may contain, for example, a contributor's personal and organizational phone numbers, email addresses, postal addresses, or other information on ways to communicate with a contributor. Additionally, a profile may contain a link to a data source from an external third-party or data obtained from such a link. For example, a profile may contain information on a contributor's schedule or availability received from an external calendar utility or information on a team's tasks or schedule from an external project management utility. In addition, a profile may contain a visual indicator of the whether or not the contributor, role, or team corresponding to the profile is a member of the organization.

Figure 6:
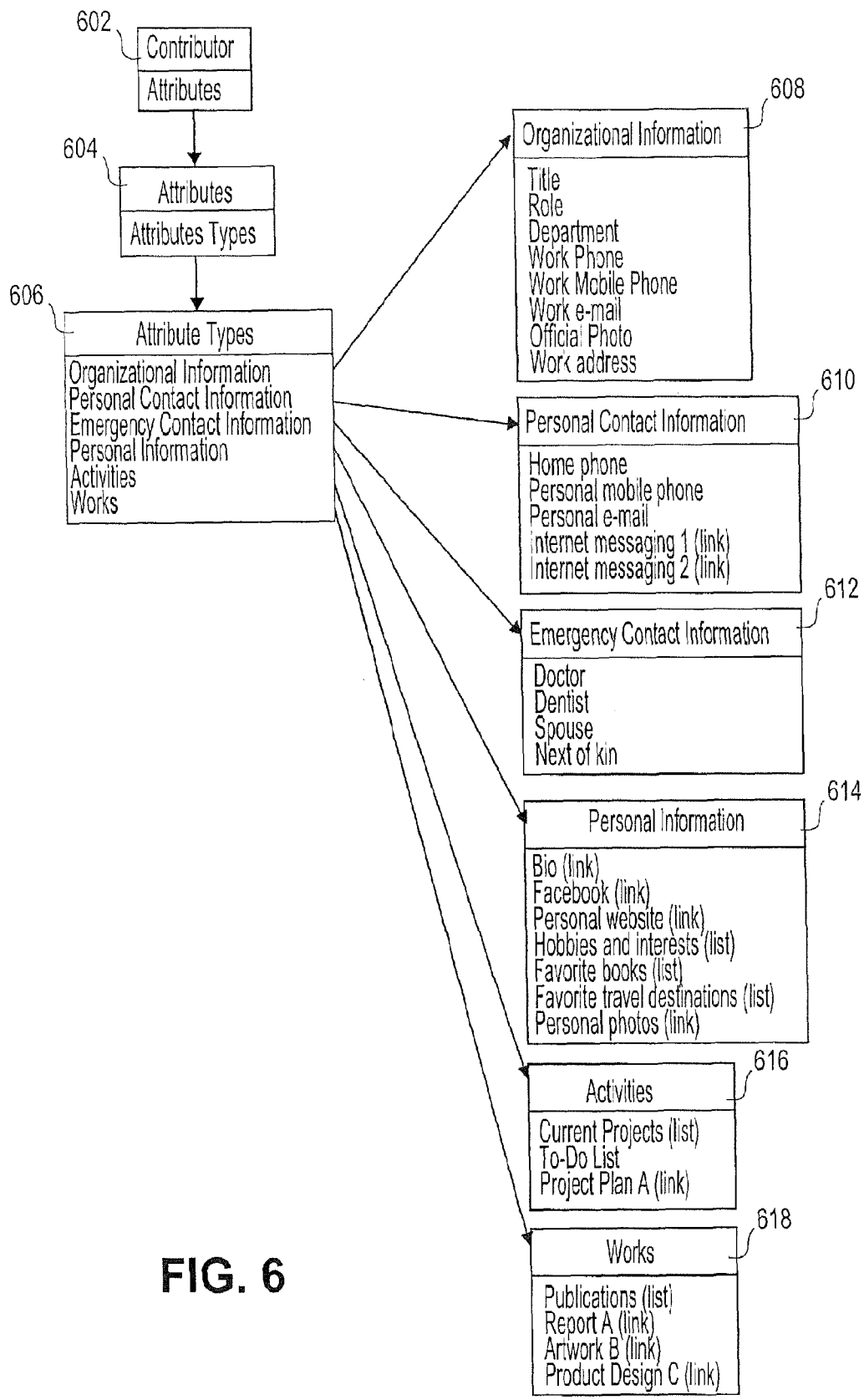
FIG. 6 depicts an example structural hierarchy of node attributes according to an embodiment.

FIG. 6 illustrates a structural hierarchy 600 of data, contact, and other attributes according to an embodiment. In this embodiment, a contributor 602 may be associated with attributes 604 which are divided into attribute types 606. The attribute types may include organizational information 608, personal contact information 610, emergency contact information 612, personal information 614, activities 616, and works 618. Each of these may further include various attributes defining specific information such as phone numbers, email addresses, projects, and the like.

In an embodiment in which a profile includes one or more contact attributes, a contact attribute may be designated as a preferred contact attribute. In such an embodiment, a preferred contact attribute is one that is designated by the contributor, role, or team corresponding to the profile as the preferred method of communication. In some embodiments, a preferred contact attribute may be set according to a schedule, such that the preferred contact attribute automatically changes according to the day of the week or the time of day. A profile may contain a visual indicator of the preferred contact attribute. Also in such an embodiment, a contact attribute included in a profile may contain a visual indicator of a contact type (e.g., telephone, email, instant message service, etc.) and a contact identifier (e.g., telephone number, email address, instant messaging service username, etc.). The viewer may be given the option of selecting the visual indicator of the contact type, in response to which a communications channel corresponding to the contact type would open that automatically connected the viewer to the contributor, role, or team corresponding to the profile using the contact identifier. In such embodiments, the contact identifier may be hidden from the user, such that a contributor may enable users to communicate with the contributor without revealing the contributor's contact information.

Figure 7:
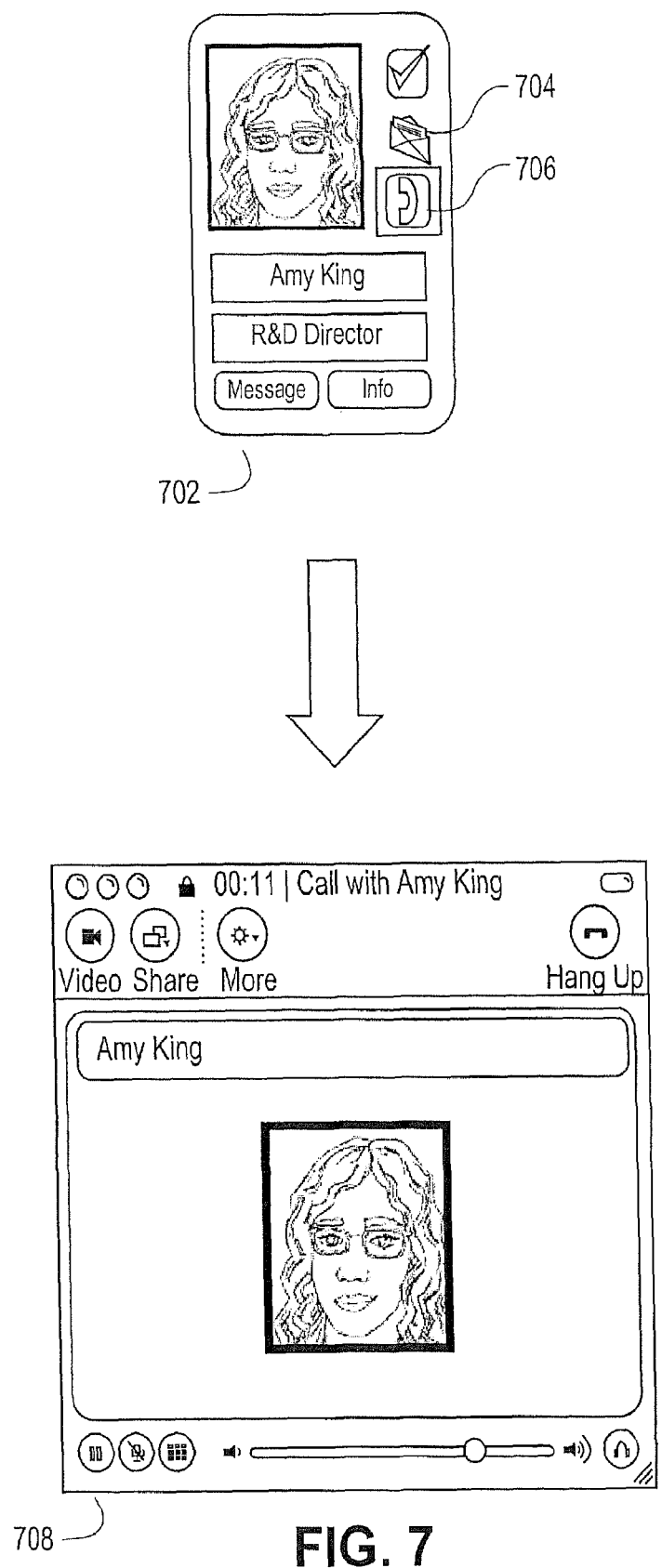
FIG. 7 depicts an example visual representation of a profile incorporating a preferred contact attribute and an instance of a communications channel in operation.

Such an embodiment is shown in FIG. 7, which illustrates a visual representation of a profile 702 that contains two contact attributes represented by visual indicators 704 (an email attribute signified by an envelope icon) and 706 (a telephone attribute signified by a phone icon). In this embodiment, the telephone attribute is designated as the preferred contact attribute, visually indicated by a square surrounding the phone icon 706. Selecting the square opens a communications channel 708 that automatically connects the user to the contributor represented by profile 702 via that user's preferred method of communication (in this case, a telephone communication channel).

In one embodiment, the visual representation of multiple relationships includes multiple visual indicators of a seniority status of the relationship. A seniority status indicates whether a relationship is hierarchical—i.e., the contributor, role, contributor in a role, or team corresponding to one node in the relationship reports directly to and/or is supervised by the contributor, role, contributor in a role, or team corresponding to the other node—or collaborative—i.e., both work in conjunction with one another and neither is senior to the other in rank or standing. In another embodiment, the visual representation of multiple relationships includes multiple visual indicators of a confirmation status of the relationship. A confirmation status indicates whether a relationship that has been defined or proposed by a user corresponding to one node has been confirmed, denied, or remains unconfirmed by a user corresponding to the other node.

Figure 8:
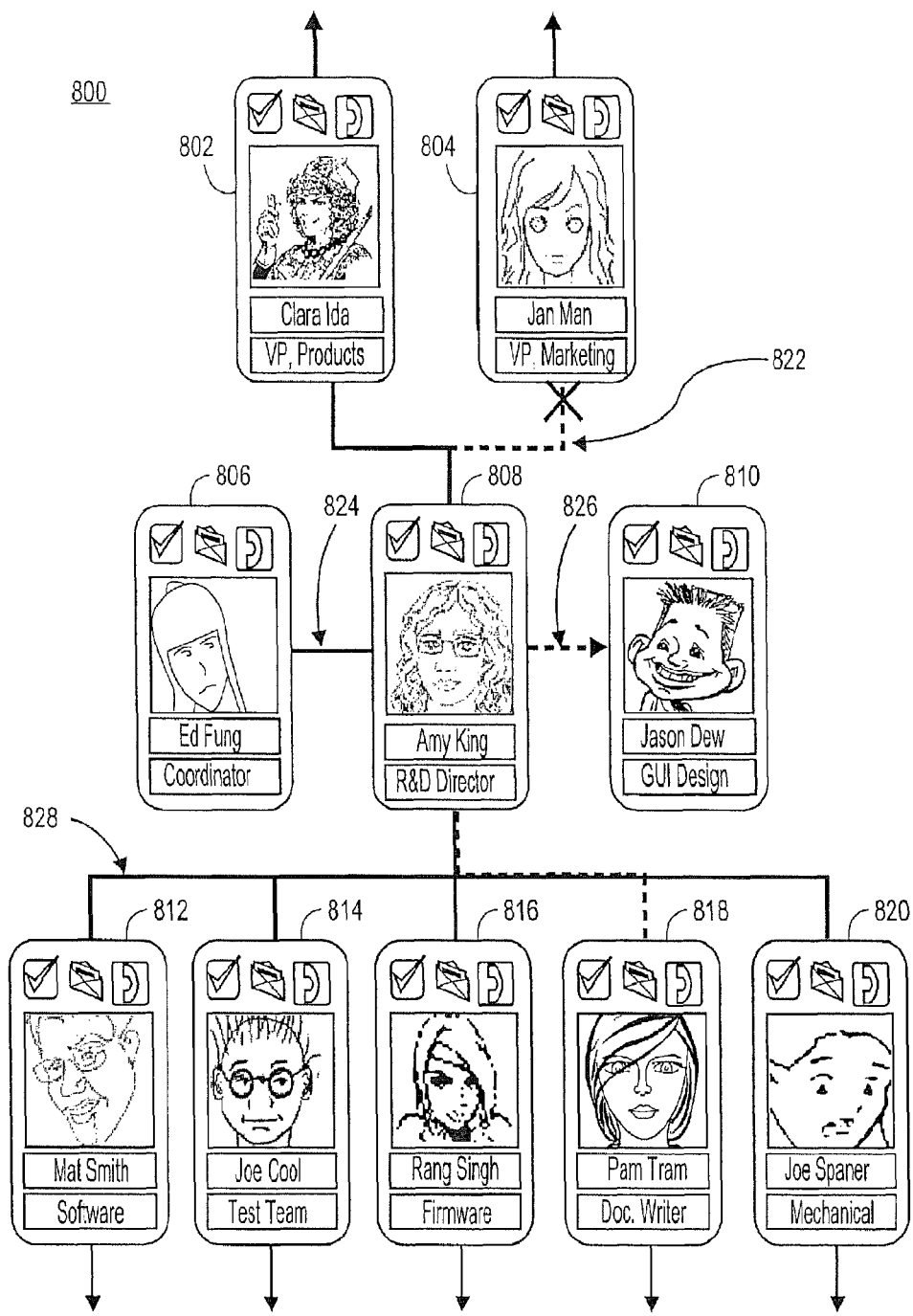
FIG. 8 depicts an example visual depiction of organizational relationships according to an embodiment.

Such an embodiment is shown in FIG. 8, which illustrates a visual depiction 800 that includes contributor profiles 802-820 and relationships 822-828. The seniority statuses of relationships 824 and 828 are visually indicated by the orientation of the profiles corresponding to the pair of contributors included in each relationship. Relationship 824 is collaborative wherein neither contributor is senior to the other, indicated by the side-by-side orientation of contributor profiles 806 and 808. Relationship 828 is hierarchical wherein contributor 808 is senior to contributor 812, indicated by the orientation of contributor profile 808 above contributor profile 812.

In addition, further information about relationships 822, 824, and 826 is indicated by the style and markings of the connectors joining the profiles corresponding to the pair of contributors included in the relationship. A hierarchical relationship in which the senior contributor is the primary contributor to which the subordinate contributor reports is indicated by a solid connector. A hierarchical relationship in which the senior contributor is the secondary contributor to which the subordinate contributor reports is indicated by a dashed connector. A collaborative relationship in which both collaborators are members of the organization is indicated by a solid connector. A relationship in which one of the collaborators is a non-member of the organization is indicated by a dashed connector. A relationship that has been confirmed by both contributors is indicated by arrows at both ends of the connector. Similarly, a relationship that has been confirmed by only one of the two contributors is indicated by an arrow at that contributor's end of the connector. A relationship that has been disputed by one of the two contributors is indicated by an 'X' at that contributor's end of the connector.

Thus, in relationship 822, contributor Jan Man is a secondary supervisor to contributor Amy King, though this has been disputed by Jan Man and remains unconfirmed by Amy King. This is indicated by the dashed connector joining profiles 808 and 804 and the 'X' symbol near profile 804. In relationship 828, contributor Amy King is a primary supervisor to contributor Matt Smith, though this remains unconfirmed by either contributor. This is indicated by the solid, unmarked joining profiles 808 and 812. Relationship 824 is between internal contributors Ed Fung and Amy King but remains unconfirmed by either contributor as indicated by the unmarked solid line between their corresponding profiles 806 and 808. Relationship 826 has been confirmed by external contributor Jason Dew but remains unconfirmed by internal contributor Amy King, indicated by the arrow pointing to profile 810 and the lack thereof near profile 808.

In one series of embodiments, various filters may be applied that limit and restrict the profiles and relationships displayed in a visual depiction. In one such embodiment illustrated from a computer system perspective in FIG. 9, the system receives a preference attribute from a user at block 904. The preference attribute may be a directive to display profiles and relationships that correspond only to certain data attributes, such as office location, team membership, or skill set. At block 906, the system receives a command from the user to generate a visual depiction. At block 908, the system generates the visual depiction according to the preference attribute received from the user in block 904.

Figure 9:
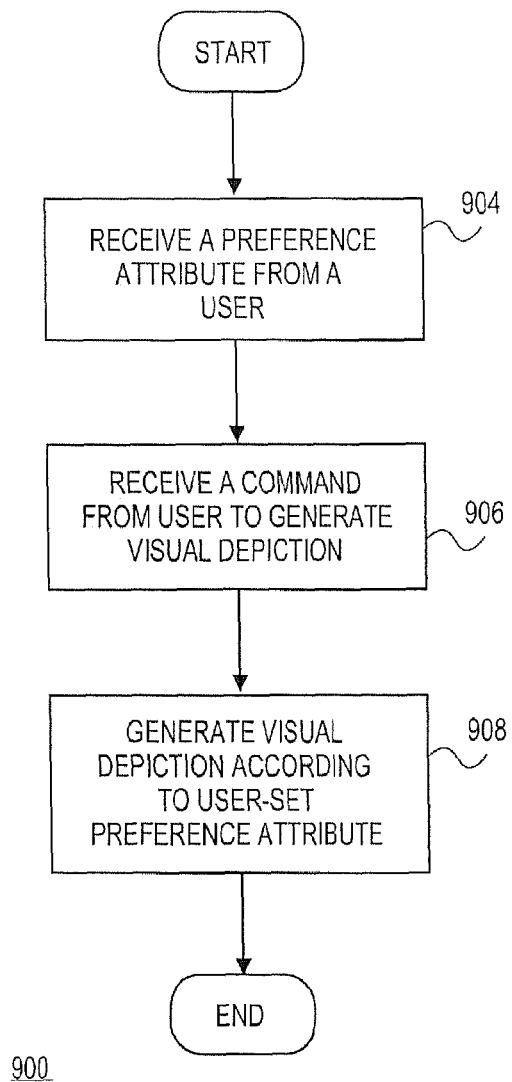
FIG. 9 depicts a block diagram illustrating an example procedure for generating a visual depiction of organizational relationships from a system perspective according to an embodiment.
Figure 10:
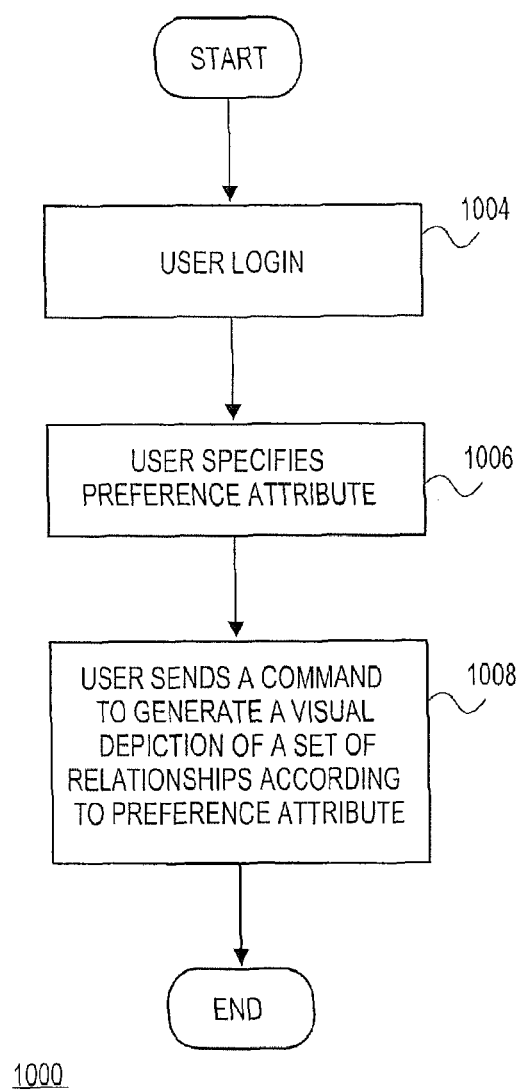
FIG. 10 depicts a block diagram illustrating an example procedure for generating a visual depiction of organizational relationships from a user perspective according to an embodiment.

FIG. 10 illustrates the embodiment of FIG. 9 from a user perspective, such that the user logs into the system at block 1004, specifies a preference attribute at block 1006, and sends a command to generate a visual depiction of a set of relationships at block 1008 according to the preference attribute specified in block 1006.

Figure 11:
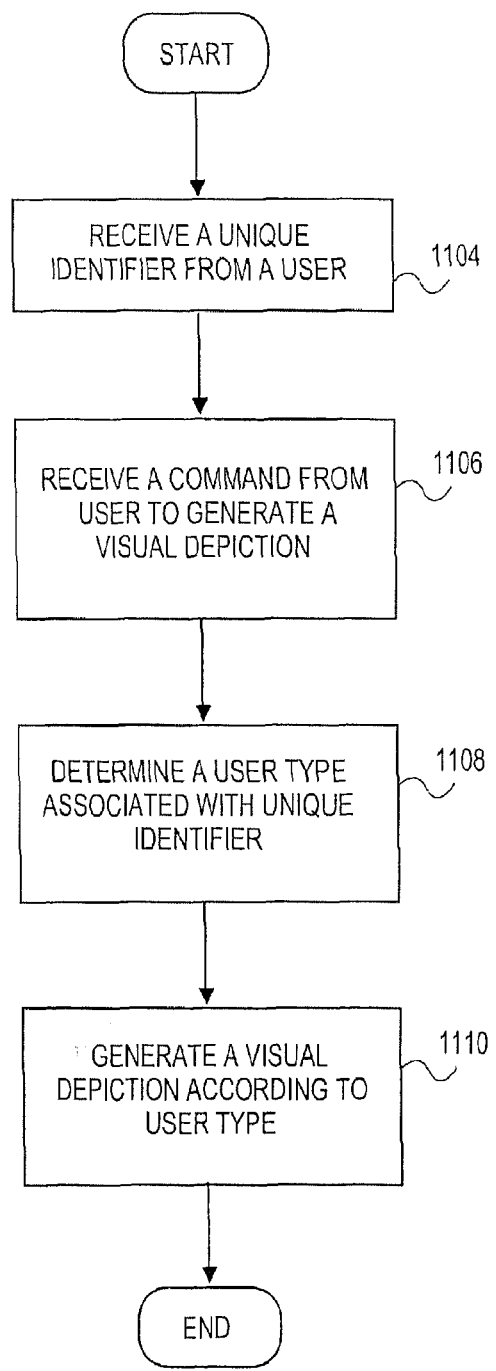
FIG. 11 depicts a block diagram illustrating an example procedure for generating a visual depiction of organizational relationships from a system perspective according to an embodiment.

In another such embodiment, filters are applied in accordance with the rights and privileges of the user accessing the system. The user has a unique identifier that is associated with a user type, which in turn specifies which contributors, roles, teams, relationships, attributes, profiles or other information the user may see. FIG. 11 illustrates an embodiment in which the system receives a unique identifier from a user at block 1104. The system receives a command from a user to generate a visual depiction at block 1106. At block 1108, the system determines the user type that is associated with the user's unique identifier and generates the visual depiction in accordance with the user type at block 1110. In this embodiment, the rights and privileges associated with the user type may be determined automatically by the seniority of the contributor, role, or team corresponding to the user or set by a system administrator who specifies various attributes controlling what a user of the system can do or see.

Figure 12:
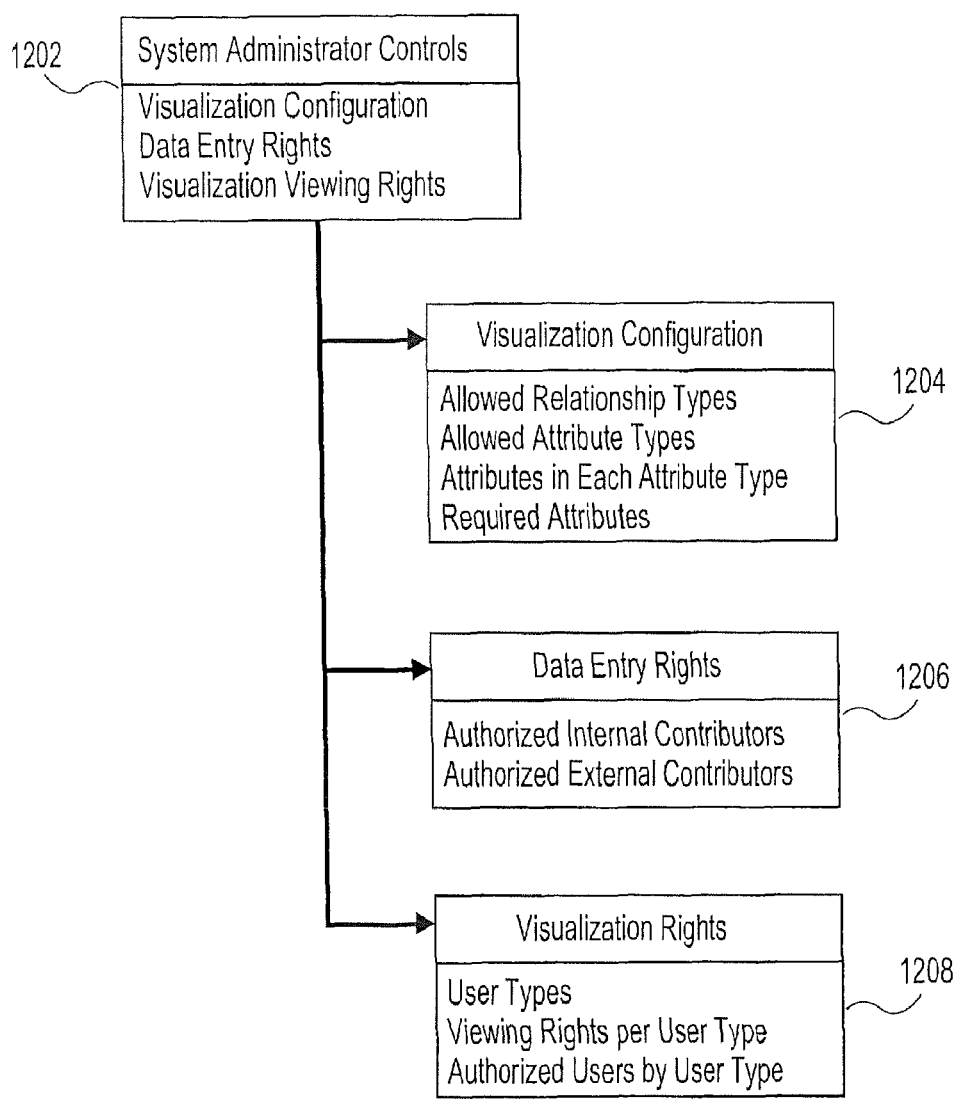
FIG. 12 depicts an example structural hierarchy of user rights and privileges attributes according to an embodiment.

FIG. 12 illustrates an example of a structural hierarchy of attributes 1200 that may include the rights and privileges of a user. The system administrator controls 1202 include visualization configuration settings 1204, data entry rights 1206, and visualization rights 1208. Visualization configuration settings 1204 define allowable relationship types, allowed attribute types, attributes in each attribute type, and required attributes. Data entry rights 1206 define authorized internal contributors and authorized external contributors. Visualization rights 1208 define user types, viewing rights by user type, and authorized users by user type.

Figure 13:
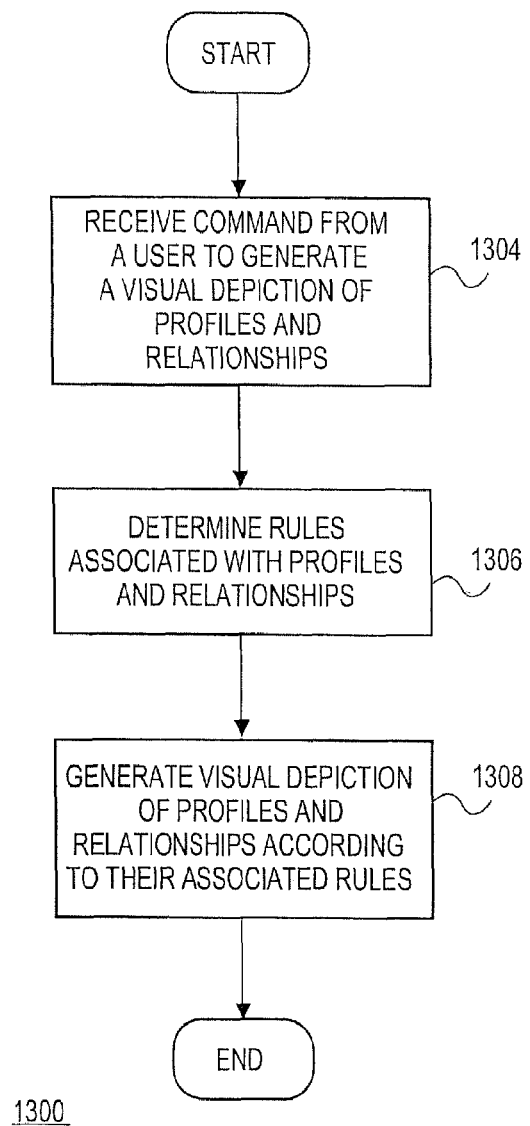
FIG. 13 depicts a block diagram illustrating an example procedure for generating a visual depiction of organizational relationships from a system perspective according to an embodiment.

In yet another such embodiment, filters may be applied that are specific to the particular profiles and relationships being viewed. These may be specified by the contributor corresponding to a profile, a system-wide administrator, a division head, a team leader, or other user. The filters may limit the profile attributes or relationships that certain users can see. In this embodiment, an example of which is illustrated in FIG. 13, the profiles and relationships are associated with profile rule attributes and relationship rule attributes, respectively. At block 1304, a system receives a command from a user to generate a visual depiction of profiles and relationships. At block 1306, the system determines the rules associated with the profiles and relationships. At block 1308, the system generates the visual depiction of the profiles and relationships requested in block 1304 according to, and to the extent permitted by, their associated rules determined in block 1306.

Figure 14B:
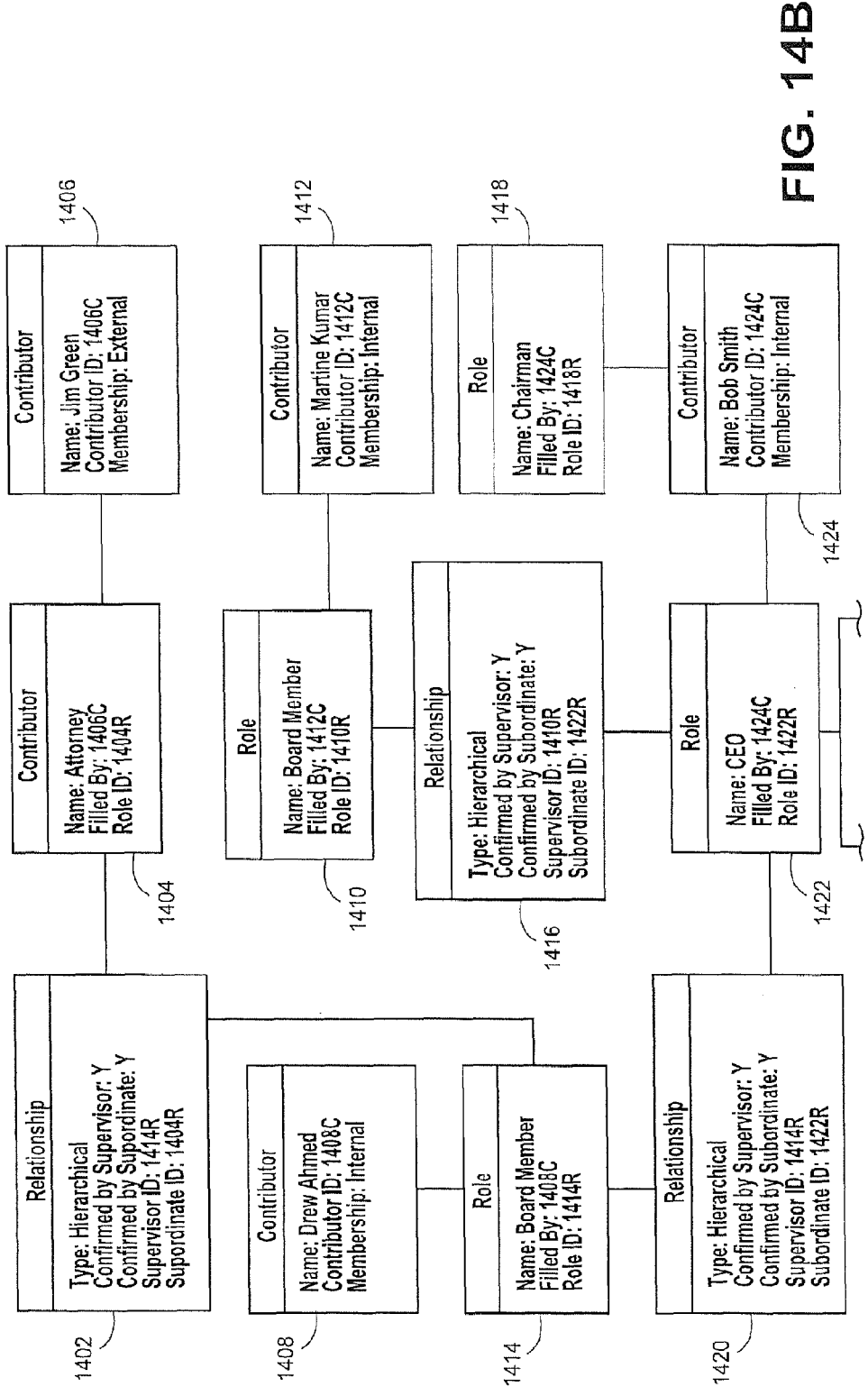
FIGS. 14B and 14C depict an example set of data structures representing organizational relationships according to an embodiment.
Figure 14C:
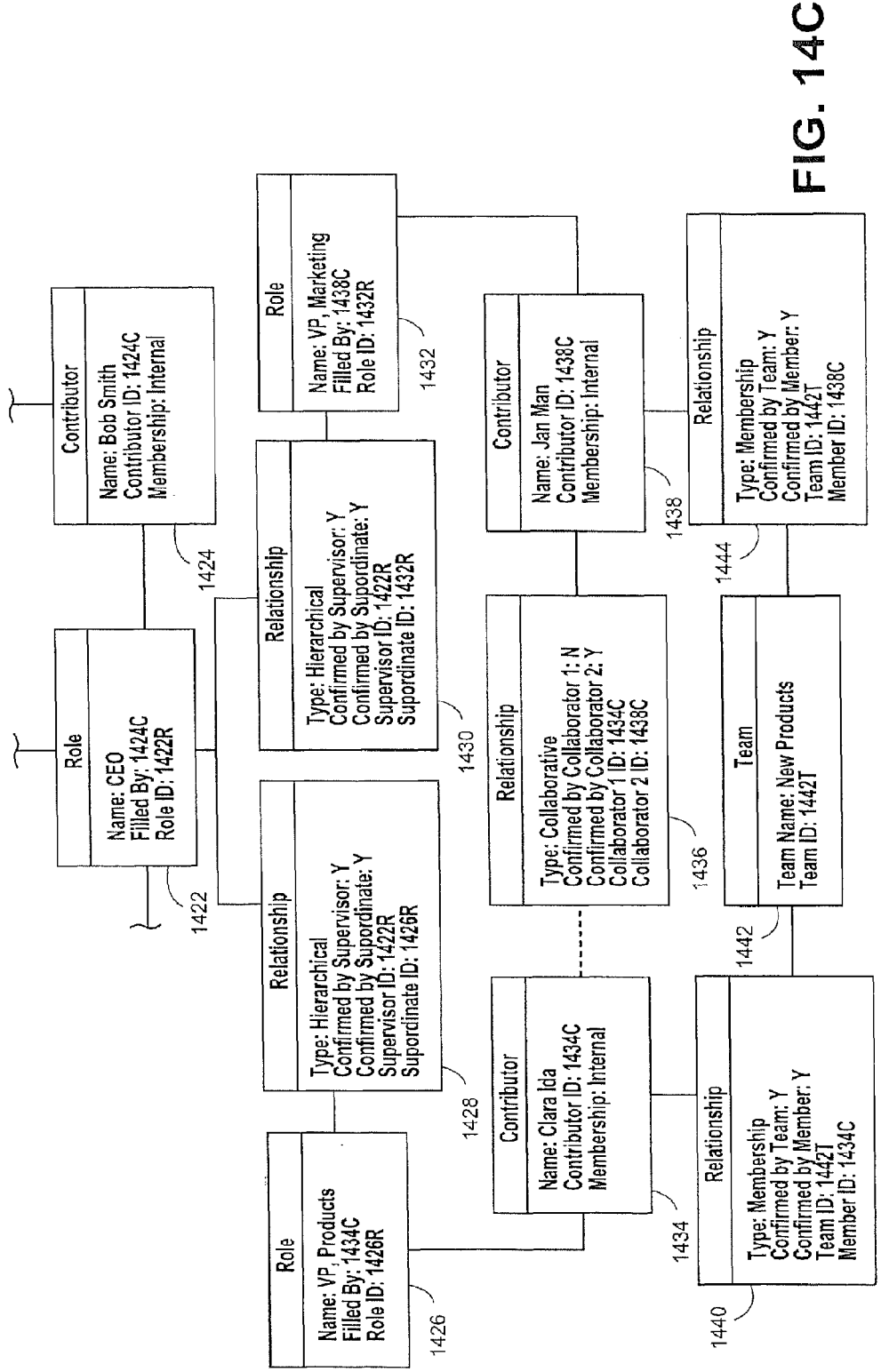

FIGS. 14A, 14B and 14C illustrate an example implementation of the organizational data according to an embodiment. The organizational data includes data structures corresponding to contributors, roles, teams, and relationships. FIG. 14A illustrates an example schema of nodes, wherein nodes may represent contributors 1401, roles 1403, or teams 1405. Contributors 1401 include a contributor ID, a contributor first name, a contributor last name, and an attribute indicating whether the contributor is internal or external to the organization. Roles 1403 include a role ID, role name, and a unique identifier referring to the contributor who fills the role. Teams 1405 include a team ID and a team name.

As illustrated by FIGS. 14B and 14C, roles are filled by contributors, and a contributor may fill more than one role. In this embodiment, contributor Bob Smith 1424 fills the roles 'CEO' 1422 and 'Chairman' 1418. Contributors Jim Green 1406, Drew Ahmed 1408, Martine Kumar 1412, Clara Ida 1434, and Jan Man 1438 fill the roles 'Attorney' 1404, 'Board Member' 1410, 'Board Member' 1414, 'VP Products' 1426, and 'VP Marketing' 1432.

As further illustrated by FIGS. 14B and 14C, relationships 1402, 1416, 1420, 1428, 1430, 1436, 1440 may exist between any pair of contributors, roles, or teams. The relationship data structure includes attributes indicating the type of relationship (e.g., hierarchical or collaborative) the type of organizational membership (internal or external), whether or not each node in the relationship has confirmed the relationship, and the unique identifiers of the nodes in the relationship (e.g., Role ID, Contributor ID, or Team ID). A hierarchical relationship includes a supervisory node and a subordinate node, a collaborative relationship includes two collaborator nodes, and a team membership includes a team node and a member node. In this embodiment, the role 'CEO' 1422 is subordinate to the supervisory roles 'Board Member' 1410 and 'Board Member' 1414, contributors 'Clara Ida' 1434 and 'Jan Man' 1438 are in a collaborative relationship, and contributors 'Clara Ida' 1434 and 'Jan Man' 1438 are both members of the team 'New Products' 1442. Additionally, a relationship may exist between a node and an external contributor; in this embodiment, the role 'Attorney' filled by external contributor Jim Green 1406 is in a subordinate relationship with the role 'Board Member' 1414.

Figure 15:
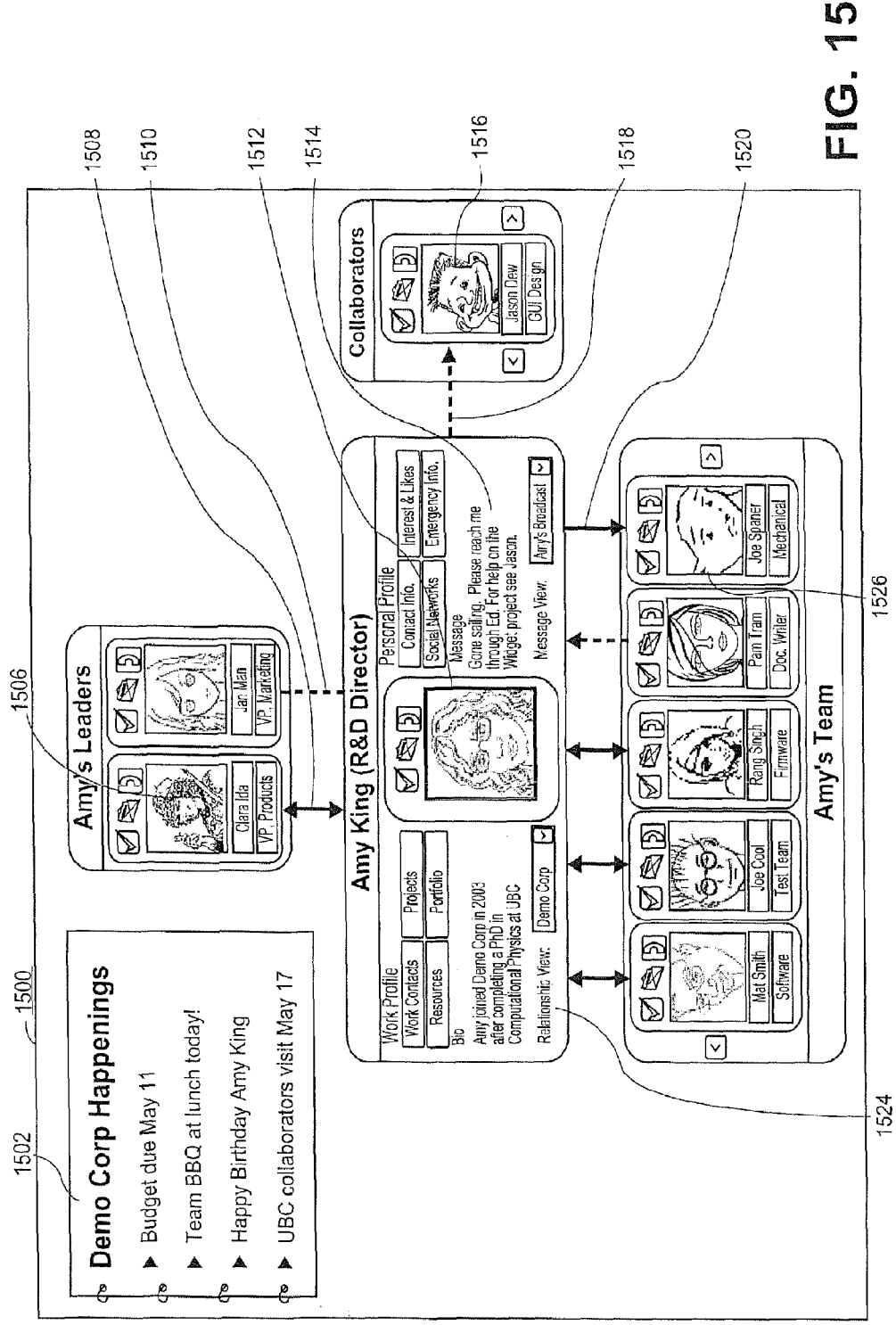
FIG. 15 depicts an example visual depiction of organizational relationships according to an embodiment.

Another embodiment of a visual depiction of organizational relationships is illustrated in FIG. 15. In this embodiment, "centric" visualizations can be generated that focus on the relationships and attributes of a particular contributor. In FIG. 15, both the supervisors 1506 and the subordinates 1526 of the centric internal contributor 1512 can be seen above and below, respectively. To the right are collaborators 1516. Connectors such as 1508, 1510, 1518, and 1520 include an indication of the confirmation statuses of the corresponding relationships. The attributes most important to the viewer—basic contact information and title—are presented, as are icons that may be clicked to directly access further attributes associated with this contributor. Among the attributes shown is a status message attribute 1514 that conveys the current status, activity or interest of the contributor to the greater community. Also provided in this embodiment is a notice board 1502 including various notes, reminders, and other information entered by the centric contributor or the user viewing the centric contributor's profile. In a particular embodiment, the user may choose and/or modify which attributes, and which associated icons or on-screen buttons, appear on the visualization 1500 and how they appear. The user may also switch to other types of views and visualizations using an option control 1524.

Figure 16:
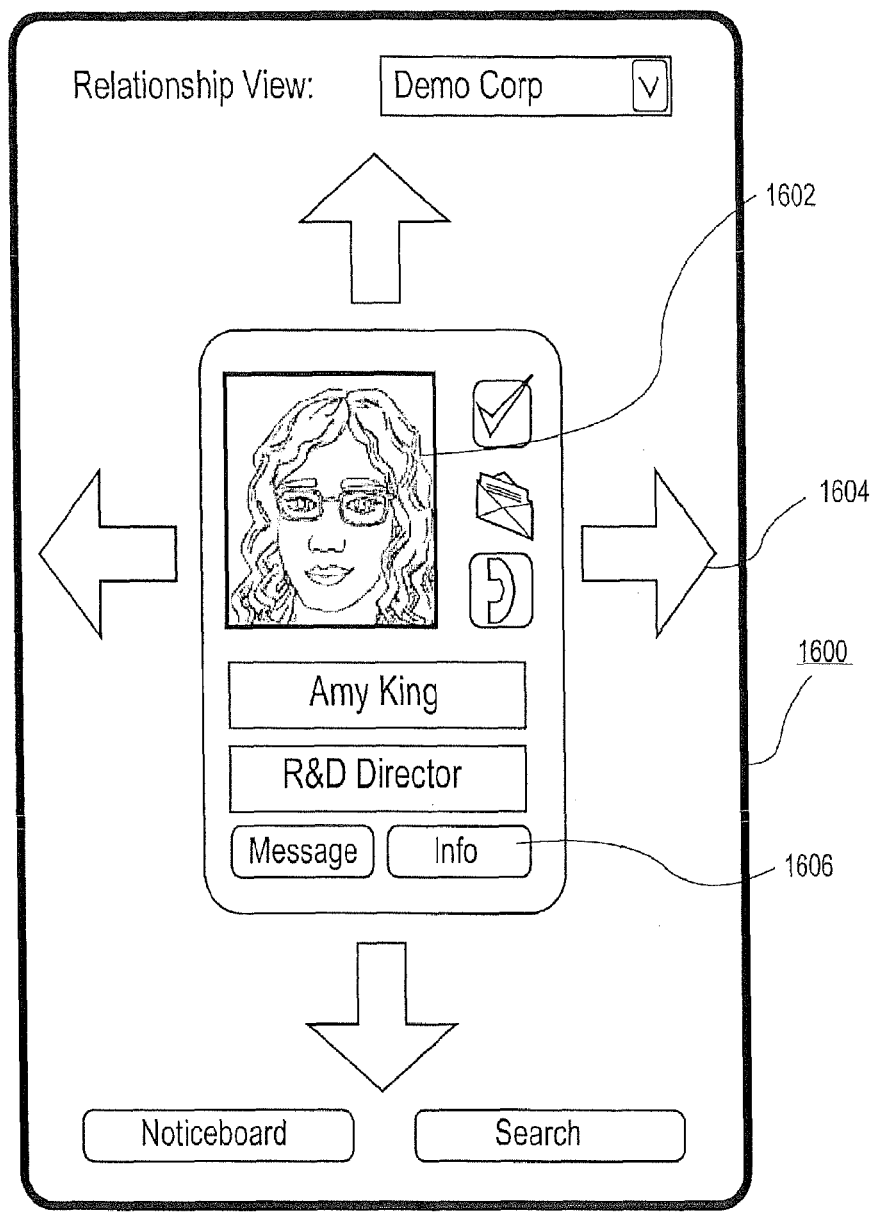
FIG. 16 depicts an example visual representation of a user profile according to an embodiment.
Figure 17:
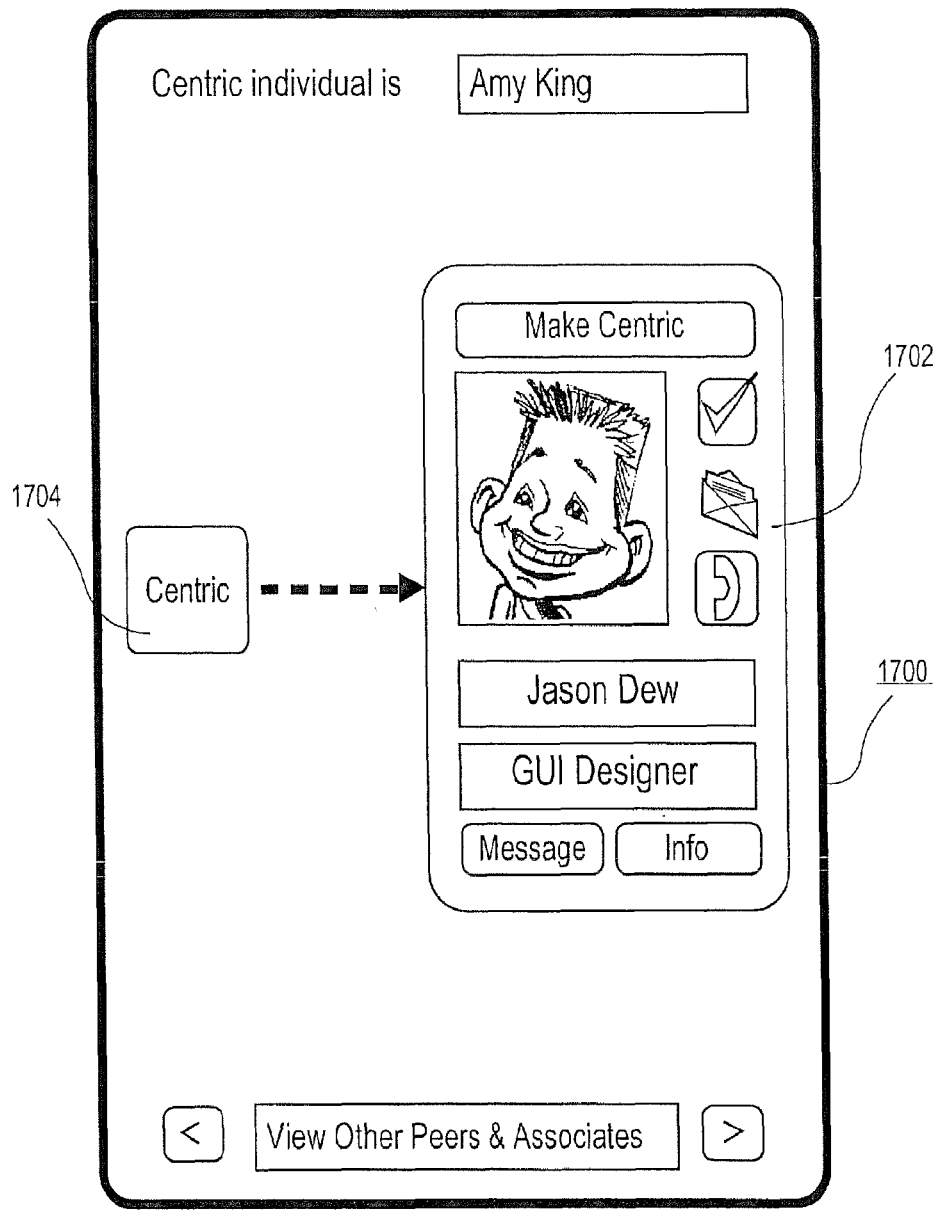
FIG. 17 depicts an example visual representation of a user profile according to an embodiment.

FIGS. 16 and 17 depict example embodiments of centric visualizations 1600 and 1700 formatted for a device with a small graphic display, such as a mobile handheld device. In FIG. 16, a subset of the attributes of the centric contributor 1602 is shown, with an 'Info' icon 1606 that may be clicked to access further attributes associated with this contributor. When the user selects feature 1604 the visualization is updated to show the first peer or collaborator of centric contributor as depicted in FIG. 17. FIG. 17 illustrates an example visualization of the centric contributor's first peer or collaborator 1700 including the collaborator's profile 1702 and an option 1704 to return to the centric visualization 1600.

Figure 18:
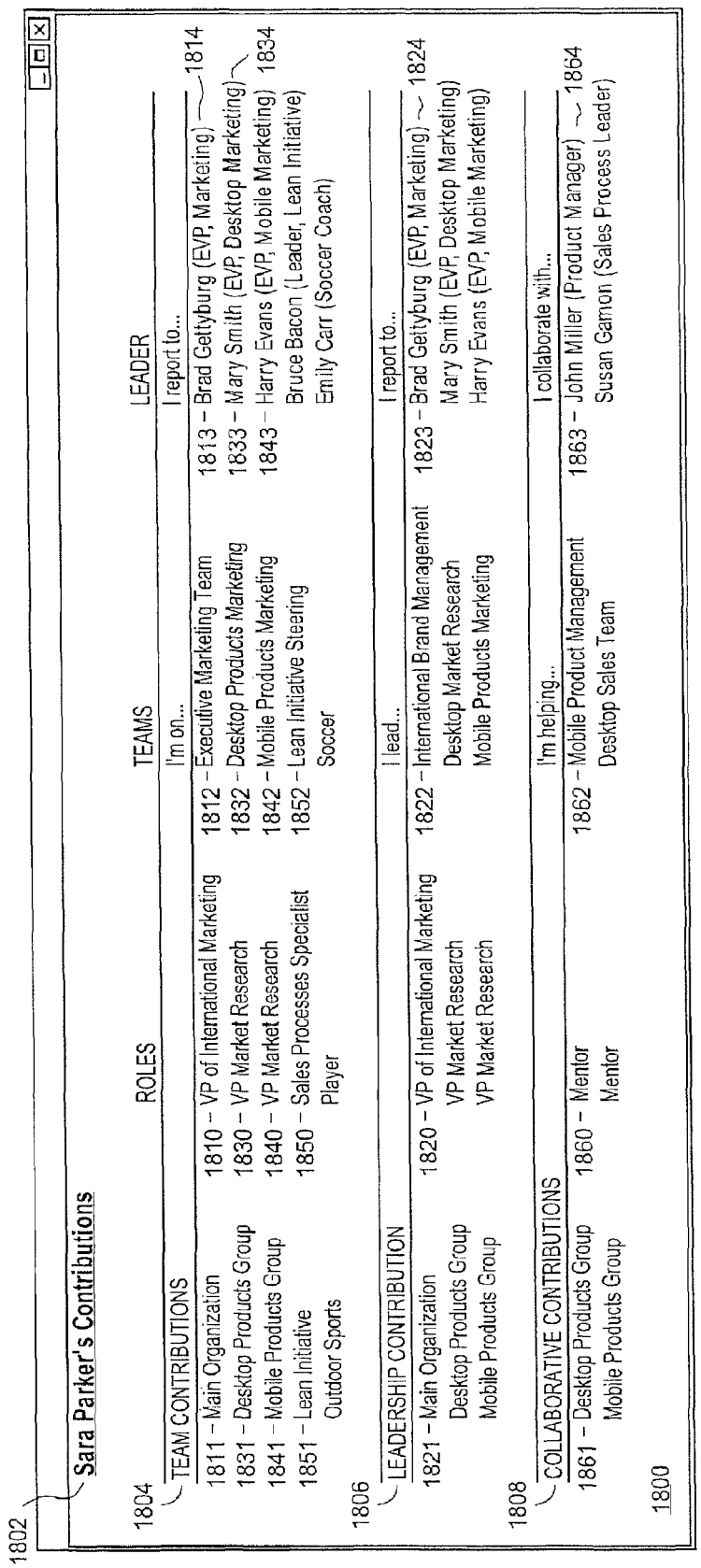
FIG. 18 depicts an example visual depiction displaying the various roles and relationships of a contributor.

In another series of embodiments, contributors that belong to more than one relationship chain (i.e., they belong to more than one structure that exists in the organization) are identified. One such embodiment is accessed via the relationship view option 1524 described earlier in relation to FIG. 15. Another such embodiment is illustrated in FIG. 18. The visualization 1800 (FIG. 18) depicts all of roles in which contributor Sara Parker participates in the organization. According to this embodiment, contributor Sara Parker 1802 is depicted along with the many roles she fills in a number of different relationship chains. The visualization clusters these roles into three types of contributions—roles on teams she is a member of (Team Contributions 1804), roles in which she leads a team (Leadership Contributions 1806) and roles in which she collaborates with someone else (Collaborative Contributions 1808).

One of Sara's roles is VP of International Marketing 1810, which is in the relationship chain Main Organization 1811 and is part of the Executive Marketing Team 1812 led by Brad Gettyburg 1813 who fills the role EVP, Marketing 1814. In this role, Sara leads the International Brand Management Team 1822. Thus, the role VP of International Marketing appears in the visualization twice (1810 and 1820), along with the associated Main Organization relationship chain (1811 and 1821), and reports-to leader Brad Gettyburg (1813 and 1823) in his EVP, Marketing role (1814 and 1824).

Two other roles of Sara Parker that are shown in the visualization 1800 are both called VP Market Research 1830 and 1840 even though they are separate roles in two separate relationship chains. These relationship chains represent two business units, one being the Desktop Products Group relationship chain 1831 and the other being the Mobile Products Group relationship chain 1841. In the Desktop Products Group 1831, the role VP Market Research 1830 is on the Desktop Products Marketing team 1832 and Sara reports to Mary Smith 1833 in her role as EVP, Desktop Marketing 1834. As VP Market Research 1840 in the Mobile Products Group 1841, Sara is on a different team, Mobile Products Marketing 1842, and reports to a different person, Harry Evans 1843. Since these two roles are leadership roles, they appear again in the Leadership Contributions cluster 1806.

In this embodiment, the user or users defining the roles and relationships have determined that the two VP Market Research roles 1830 and 1840 are distinct, one serving the Desktop Products Group and the other serving the Mobile Products Group. Thus, in this example, role 1830 and role 1840 each have a unique "role ID" in the underlying data structure. This allows each of these roles to have its own distinct profile and attributes, even though they happen to share the same name (VP Market Research) and are filled by the same contributor Sara Parker 1802. Alternatively, the user or users defining these roles may determine that the VP Market Research role is a single role shared across multiple relationships chains. In this case, role 1830 and role 1840 would share the same unique role ID in the underlying data structure and be associated with a single profile corresponding to the attributes of this single role that serves two separate business units.

In another role, Sara contributes to the Lean Initiative Steering team 1852 that is in the Lean Initiative relationship chain 1851. In the role Sales Process Specialist 1850, Sara is an individual contributor and has no subordinates. Thus, this role does not appear in the roles clustered under Leadership Contributions 1806. In any particular relationship chain, the most senior role at the top node of the chain appears only in the Leadership Contributions cluster 1806, all non-collaborative roles that have no subordinates appear only in the Team Contributions cluster 1804, and all other non-collaborative roles appear in both the Leadership Contribution cluster 1806 and the Team Contributions cluster 1804.

One of Sara's Collaborative Contributions 1808 is the role of Mentor 1860 to John Miller 1863 who is a Product Manager 1864 and leads the Mobile Product Management team 1862. This role is also in the Desktop Products Group relationship chain 1861.

Figure 19:
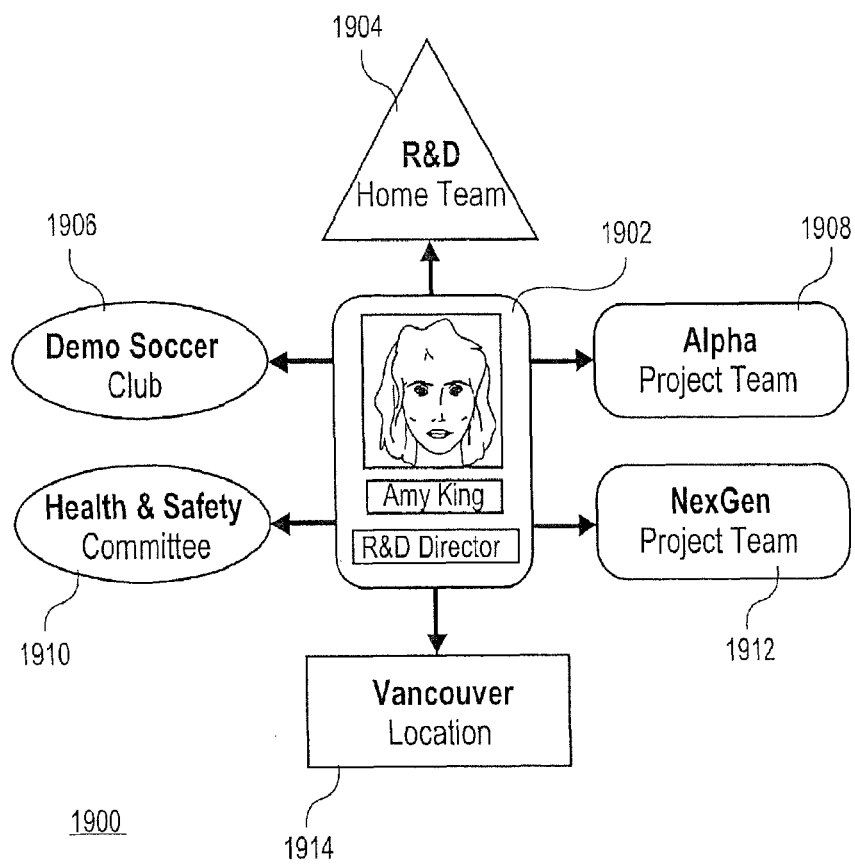
FIG. 19 depicts an example visual depiction displaying the various relationships of a contributor.

Another such embodiment is illustrated in FIG. 19. In a visualization 1900, according to this embodiment, a profile for contributor Amy King 1902 is depicted along with the various teams that Amy King is a member of, namely R&D 1904, Demo Soccer 1906, Alpha 1908, Health & Safety 1910, NexGen 1910, and Vancouver 1914. Each team is depicted along with an attribute describing the nature of the team (e.g., club, committee, location, product team, etc.).

Figure 20:
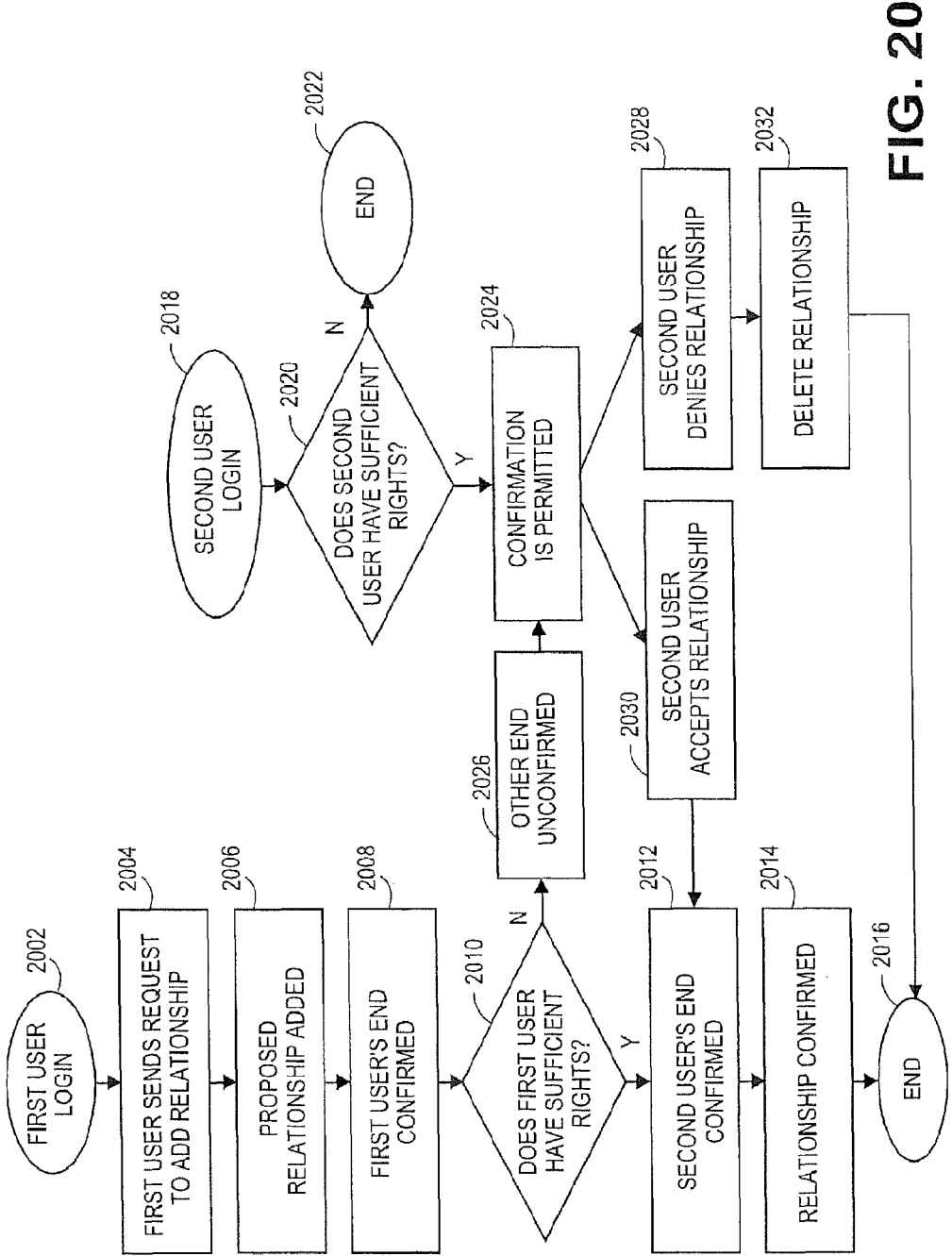
FIG. 20 depicts a block diagram illustrating an example procedure for defining and confirming organizational relationships according to an embodiment.

FIG. 20 illustrates an example method of an embodiment in which a relationship is defined by a first user involving a node corresponding to the first user and a node corresponding to a second user. Thus, in this example, the relationship has two ends: the first user's end and the second user's end. A relationship is confirmed when the first end and the second end are each confirmed by the first user and the second user, respectively. At operation 2002, a first user logs into the system. At operation 2004, the first user submits a request to add a relationship, which is added as a proposed relationship at operation 2006. Because the first user has added a relationship involving himself, the first user's end of the relationship is automatically confirmed at operation 2008. At operation 2010, a determination is made whether the first user has sufficient rights to unilaterally define a confirmed new relationship without the consent of the second user. If the first user has sufficient rights, the second user's end is also automatically confirmed, resulting in confirmation of the relationship at operation 2014 and conclusion of the method at operation 2016. If the first user does not have sufficient rights, the second user's end remains unconfirmed awaiting action from the second user at step 2026.

In a series of operations performed separately or in parallel, a second user logs into the system at step 2018. A determination is made whether the second user has sufficient rights to confirm an end of a relationship at step 2020. If the user does not have sufficient rights, the method concludes at step 2022. If the user has sufficient rights, an option allowing the second user to confirm their end of the relationship is enabled at operation 2024. The second user may accept the relationship at step 2030, resulting in confirmation of the second user's end at operation 2012 and confirmation of the relationship at operation 2014. Alternatively, the second user may deny the relationship at operation 2028, in which case the relationship is deleted at operation 2032. The method then concludes at operation 2016.

Figure 21A:
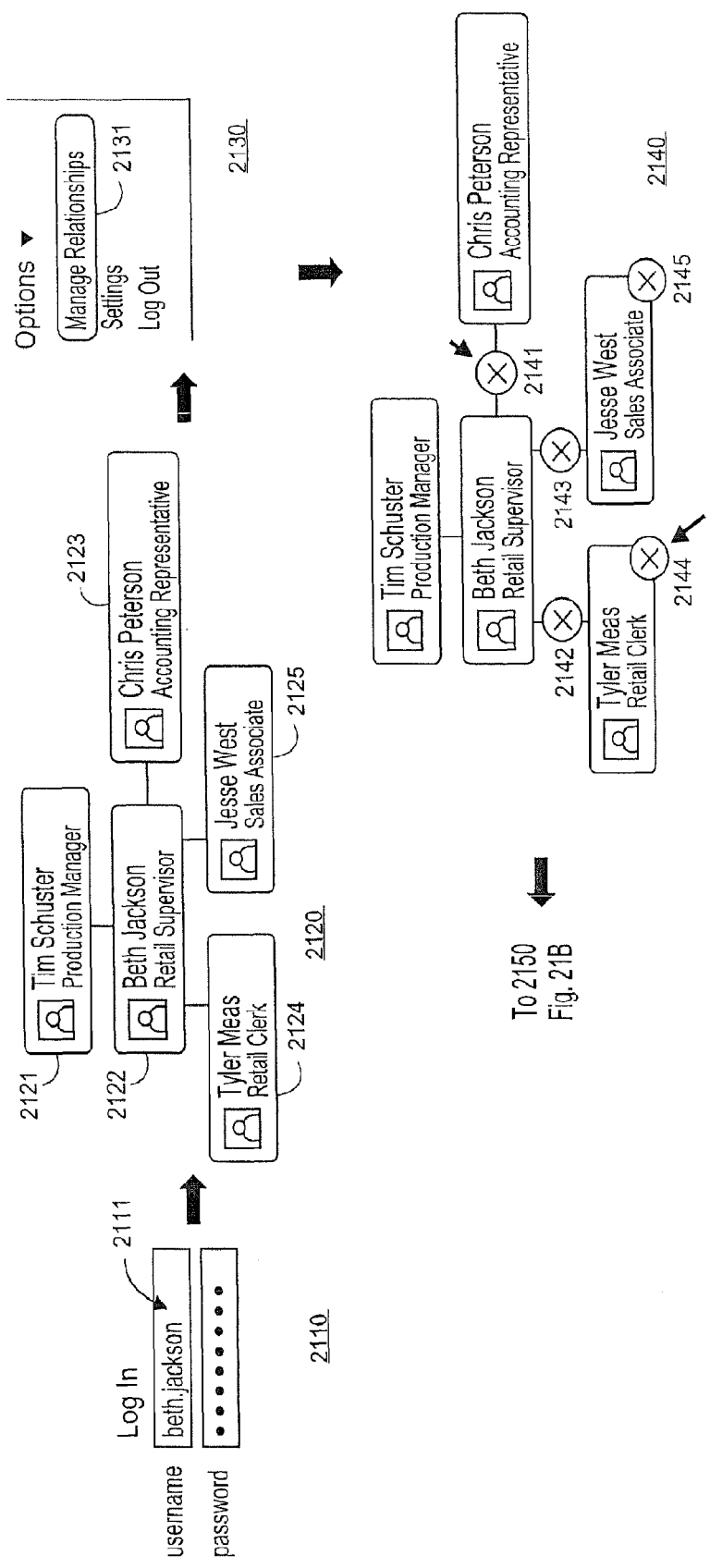
Figure 22A:
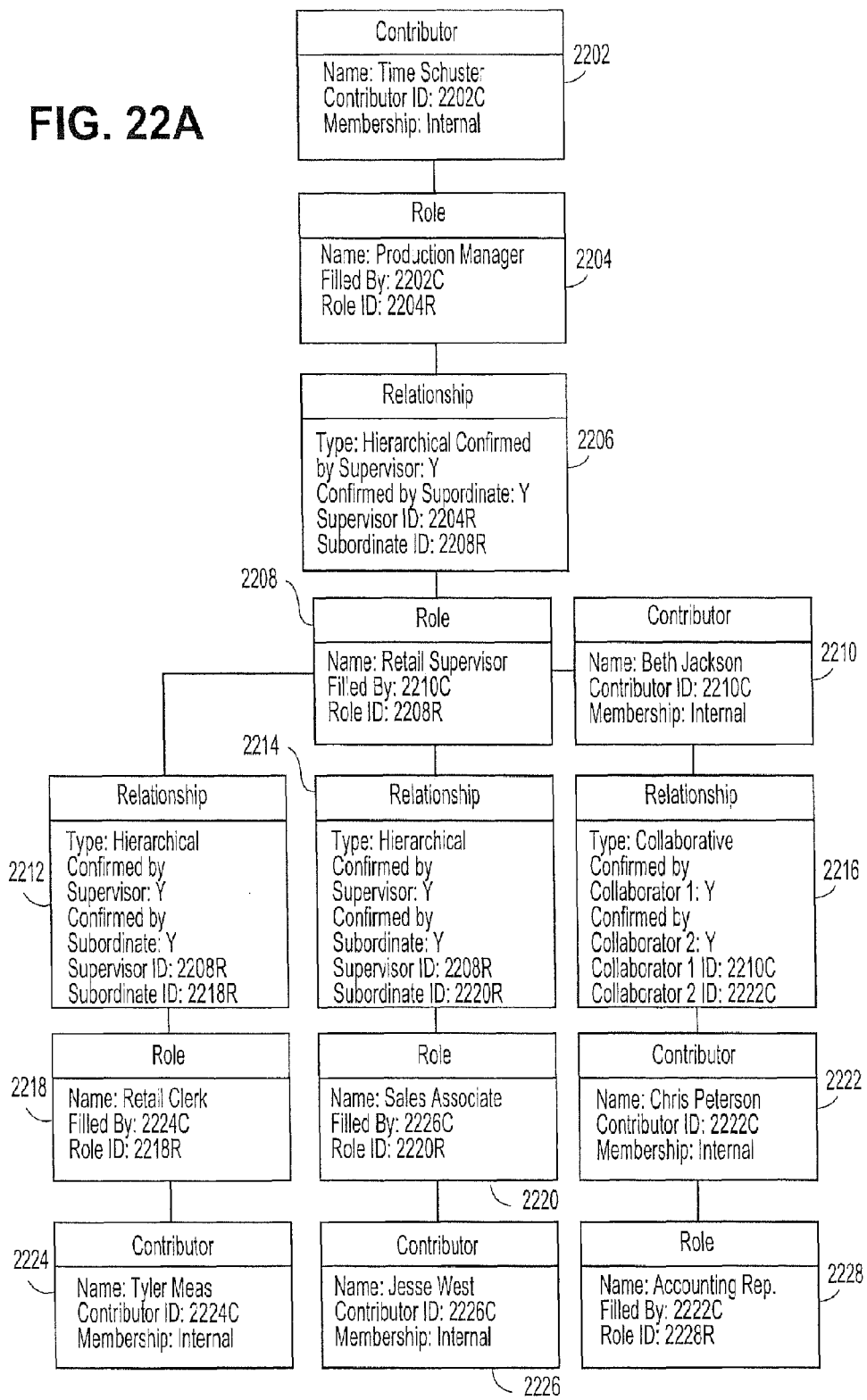
FIGS. 22A, 22B, and 22C depict data structures corresponding to the organizational data represented in FIGS. 21A and 21B.
Figure 22B:
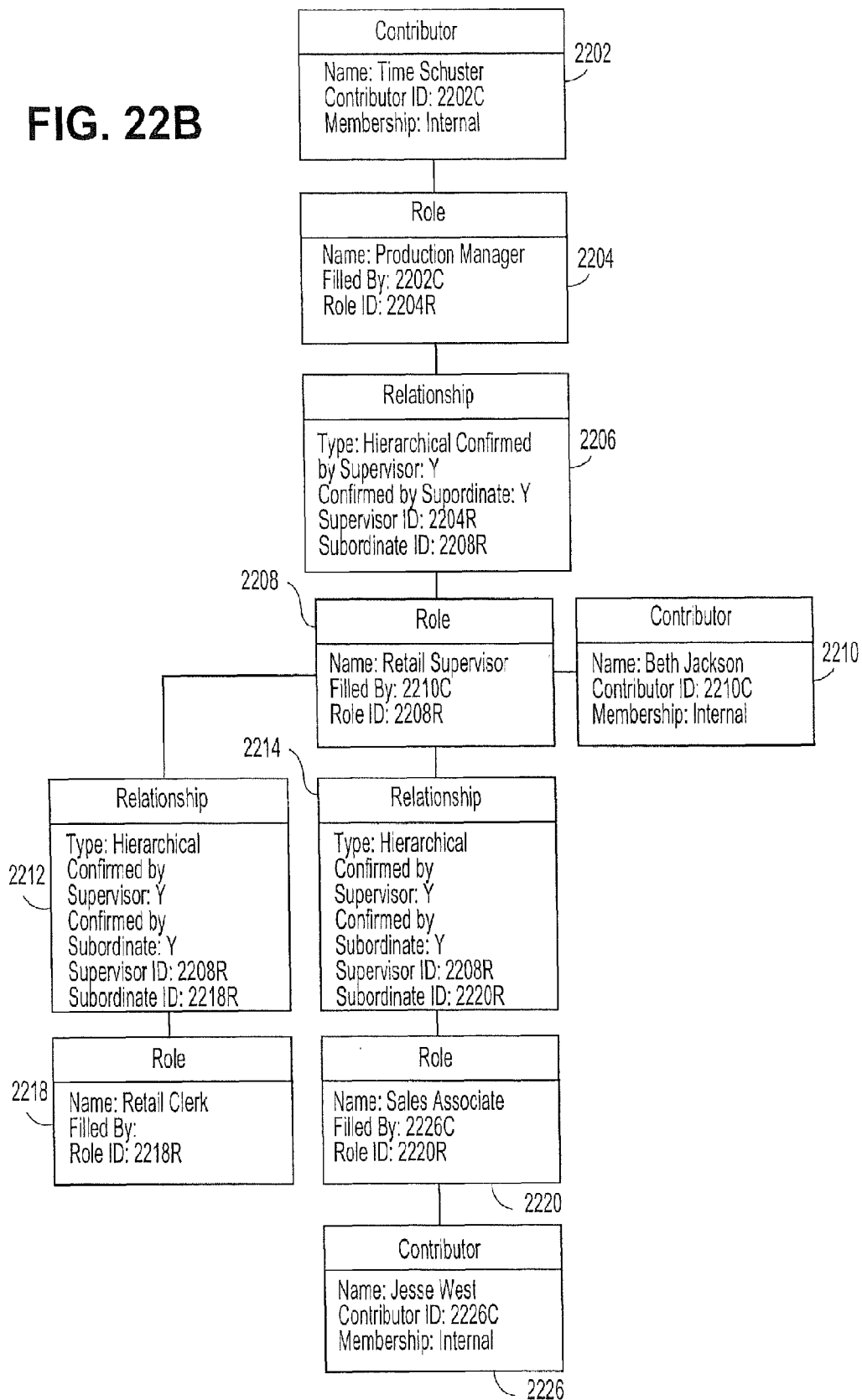
Figure 22C:
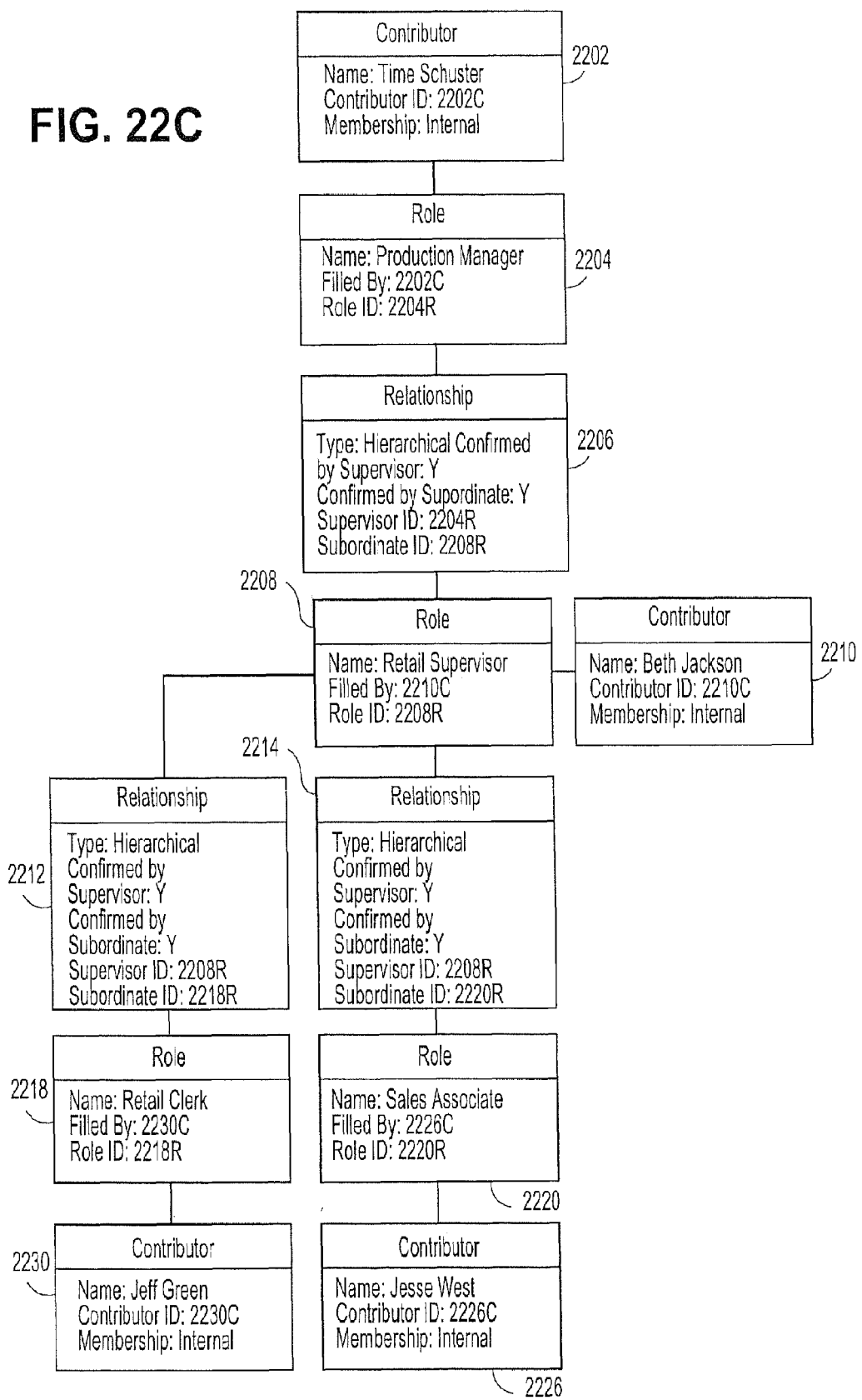

FIGS. 21A, 21B, 22A, 22B, and 22C illustrate an example embodiment of the approach in operation. The visual depictions corresponding to various operations are illustrated in FIGS. 21A and 21B, while the underlying data structures representing the depicted organizational data are illustrated in FIGS. 22A, 22B, and 22C. At operation 2110 in FIG. 21A, a user logs in to the system. Using her unique identifier 2111, the system identifies the user as contributor Beth Jackson and displays a "centric" visualization (described above and illustrated in FIG. 15) focused on contributor Beth Jackson at operation 2120. The visualization includes profiles 2121, 2122, 2123, 2124, and 2125 of contributor Tim Schuster filling the role of Production Manager, contributor Beth Jackson filling the role of Retail Supervisor, contributor Chris Petersen filling the role of Accounting Representative, contributor Tyler Meas filling the role of Retail Clerk, and contributor Jesse West filling the role of Sales Associate, respectively.

FIG. 22A illustrates the underlying data structures corresponding to the data displayed at operation 2120. The role Retail Supervisor 2208 (filled by contributor Beth Jackson 2210) is a subordinate in its relationship 2206 with the role Production Manager 2204 (filled by contributor Tim Schuster 2202) and a superior in its relationships 2212 and 2214 with the roles Retail Clerk 2218 (filled by contributor Tyler Meas 2224) and Sales Associate 2220 (filled by contributor Jesse West 2226), respectively. Additionally, contributor Beth Jackson 2210 is in a collaborative relationship with contributor Chris Petersen 2222 who fills the role Accounting Representative 2228.

Returning to FIG. 21A, at operation 2130, the user selects an option to manage her relationships. A view enabling the user to modify relationships is displayed at operation 2140. This view includes icons 2141, 2142, and 2143 enabling the user to delete the indicated relationships and icons 2144 and 2145 enabling the user to remove the contributors corresponding to the indicated profiles from the listed roles. Because the role filled by contributor Beth Jackson (who has been identified by the system as the user) is subordinate to the role filled by contributor Tim Schuster, she is not given the option to remove contributor Tim Schuster from his role or modify her role's relationship with his role. Similarly, because contributor Chris Petersen is not subordinate to contributor Beth Jackson and because the collaborative relationship between them is between the contributors and not the roles, the user is not given the option to remove contributor Chris Peterson from his role Accounting Representative.

The user selects icon 2141 severing the relationship between contributor Beth Jackson and contributor Chris Petersen and icon 2144 removing contributor Tyler Meas from the role Retail Clerk. At operation 2150, an updated visualization is displayed reflecting the modifications made in operation 2140. Because the relationship between contributor Beth Jackson and contributor Chris Peterson was deleted, the profile corresponding to contributor Chris Petersen has been removed from view. However, although contributor Tyler Meas was removed from his role of Retail Clerk, because the relationship between the roles Retail Supervisor and Retail Clerk still exists, the profile 2151 is updated to list Retail Clerk as an unfilled role.

FIG. 22B illustrates the underlying data structures corresponding to the data displayed at operation 2150. The contributor Chris Petersen 2222 and his role Accounting Representative 2228 from FIG. 22A are absent from FIG. 22B because the relationship between contributor Chris Petersen 2222 and contributor Beth Jackson 2210 has been deleted. Contributor Tyler Meas 2224 from FIG. 22A is absent from FIG. 22B because he has been removed from the role Retail Clerk 2218. The role Retail Clerk 2218 (along with its relationship 2212 with role Retail Supervisor 2208) is present but is unfilled by a contributor.

Returning to FIG. 21B, an option 2152 to add a contributor to the profile 2151 corresponding to the unfilled role Retail Clerk is displayed. Selecting this option takes the user to a search interface at operation 2160. A user search for the string 'Green' prompts the user at operation 2170 with three profiles 2171, 2172, and 2173, each accompanied by an option to add the node corresponding to the profile to the role Retail Clerk. In this example, the user selects the option 2174 accompanying the profile corresponding to contributor Jeff Green. At operation 2180, an updated visualization including a profile 2181 corresponding to user Jeff Green and listing the role Retail Clerk is displayed in place of the profile 2151 corresponding to the unfilled role Retail Clerk.

FIG. 22C illustrates the underlying data structures corresponding to the data displayed at operation 2180. Contributor Jeff Green 2230 now fills the role Retail Clerk 2218.

As discussed herein, the invention may involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other methods of configuring code to define the operations of a microprocessor in accordance with the invention will not depart from the spirit and scope of the invention.

Within the different types of devices, such as laptop or desktop computers, hand held devices with processors or processing logic, and computer servers or other devices that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state. The invention is not limited to any particular type of memory device, or any commonly used protocol for storing and retrieving information to and from these memory devices, respectively.

Embodiments of the systems and methods described herein facilitate the identification, organization and display of organizational information. Additionally, some embodiments are used in conjunction with one or more conventional information processing systems. For example, one embodiment is used as an improvement of existing systems and methods for identifying, organizing and displaying organizational information.

Although the components and modules illustrated herein are shown and described in a particular arrangement, the arrangement of components and modules may be altered to manage information in a different manner. In other embodiments, one or more additional components or modules may be added to the described systems, and one or more components or modules may be removed from the described systems. Alternate embodiments may combine two or more of the described components or modules into a single component or module.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method of generating a visual representation of a structure of an organization of humans, the method comprising:
receiving data from a plurality of users, the data defining a plurality of organizational relationships between organizational roles to be undertaken by members of the organization, said receiving including at least receiving data from a first user defining a first organizational relationship between organizational roles and receiving data from a second user defining a second organizational relationship between organizational roles, wherein the data is received at a computer server from a plurality of network devices coupled to the computer server via a network, and wherein at least one of the organizational roles is common to both the first and second organizational relationships, and wherein at least one of the organizational relationships so defined is hierarchical, and wherein the organizational roles can each be filled by a member of the organization or unfilled and wherein an individual member of the organization can fill more than one organizational role;
generating a structure of the organization from the data defining the plurality of organizational relationships, the structure having a plurality of connected nodes, wherein organizational roles are represented by nodes and relationships between these nodes are represented by connections between these nodes and wherein there is not a one-to-one correspondence of organizational roles to members of the organization; and
displaying a visual representation of the structure.

2. The method according to claim 1, wherein the data defining each of the plurality of organizational relationships further identifies and a type of the relationship between the pair of roles and wherein at least two types of relationships between pairs of roles is represented in the structure.

3. The method according to claim 2, wherein a first type of relationship between pairs of roles is hierarchical and a second type of relationship between pairs of roles is collaborative.

4. The method according to claim 2, wherein hierarchical relationships between pairs of roles are represented in the visual representation by vertical orientation of the corresponding pair of nodes.

5. The method according to claim 3, wherein collaborative relationships between pairs of roles are represented in the visual representation by horizontal orientation of the corresponding pair of nodes.

6. The method according to claim 2, wherein a first type of relationship between pairs of roles is hierarchical and wherein a particular node has both a primary hierarchical relationship and a secondary hierarchical relationship.

7. The method according to claim 6, wherein the primary hierarchical relationship is represented in the visual representation by a solid line connector and the secondary hierarchical relationship is represented in the visual representation by a dashed line connector.

8. The method according to claim 1, further comprising receiving data identifying an organizational relationship between a role of the organization and an entity outside of the organization and including a representation of the relationship between the role of the organization and the entity outside of the organization in the visual representation of the structure.

9. The method according to claim 1, further comprising receiving data identifying a team contributing to the organization and including a representation of the team in the visual representation of the structure.

10. The method according to claim 9, wherein nodes within the visual representation of the structure each represents a team.

11. The method according to claim 9, wherein a collection of nodes within the visual representation of the structure represents a team.

12. The method according to claim 9, wherein the representation for a particular team comprises profile data for each of a plurality of individual members of the organization.

13. The method according to claim 9, wherein the representation for a particular team comprises profile data for a plurality of roles.

14. The method according to claim 1, wherein at least some roles are filed by individual members of the organization and at least one role is unfilled.

15. The method according to claim 1, wherein multiple instances of a specific role appear in the visual representation.

16. The method according to claim 1, wherein a particular individual member of the organization fills a plurality of roles within the organization and each role of the particular individual is represented by a different node.

17. The method according to claim 16, wherein the nodes representing each role of the particular individual occupy different positions in the structure of the organization.

18. The method according to claim 16, further comprising selectively displaying the different positions in the structure of the organization that are occupied by the nodes representing each role of the particular individual.

19. The method according to claim 1, wherein the visual representation of the structure includes at least one visual indicator of a confirmation status of an organizational relationship represented in the visual representation.

20. The method according to claim 1, further comprising receiving profile data for members of the organization and wherein the visual representation of the structure includes visual representations of the profile data in association with the role or roles filled by such members.

21. The method according to claim 20, wherein the profile data identifies a type of individual contributor to the organization.

22. The method according to claim 21, wherein the profile data includes a preferred contact attribute for the individual contributor.

23. The method according to claim 1, further comprising receiving at least one filter preference from a user and wherein the visual representation of the structure is determined according to the filter preference or a combination of filter preferences.

24. The method according to claim 1, wherein the visual representation of the structure is displayed differently for different users.

25. The method according to claim 24, wherein only a portion of the structure of the organization is included in the visual representation of the structure available to a particular user.

26. The method according to claim 24, further comprising associating a user with a user type and wherein visual representation of the structure is determined according to the user type.

27. The method according to claim 1, further comprising incrementally receiving data defining organizational relationships and incrementally updating the structure of the organization in response to the incrementally received data.

28. The method according to claim 1, wherein the first user is a member of the organization and wherein the data defining the first organizational relationship defines a relationship between a role filled by the first user and at least one other member of the organization.

29. The method according to claim 1, wherein a plurality of users are each allowed to add and modify relationships of which the user is a part of or is otherwise directly responsible for.

30. The method according to claim 29, wherein the user's ability to make additions and modifications is limited by rules that are specifically applied to a user or group of users.

31. The method according to claim 1, wherein the visual representation of the structure shows a subset of the nodes with a particular node corresponding to a particular member being centric to a display area.

32. The method according to claim 31, wherein the visual representation shows only relationships, roles and profile data for the particular member.

33. The method according to claim 1, wherein visual representation of the structure includes profile data associated with a role or team where the profile includes a link to a third party data source.

34. The method according to claim 1, wherein visual representation of the structure includes profile data associated with a role or team where the profile includes data received from a third party data source.

35. A system for generating a visual representation of a structure of an organization of humans, the system comprising:
a computer server configured to receive data from a plurality of users, the data defining a plurality of organizational relationships between organizational roles to be undertaken by members of the organization, including at least data from a first user defining a first organizational relationship between organizational roles and data from a second user defining a second organizational relationship between organizational roles, and wherein at least one of the organizational roles is common to both the first and second organizational relationships, and wherein at least one of the organizational relationships so defined is hierarchical, and wherein the organizational roles can each be filled by a member of the organization or unfilled and wherein an individual member of the organization can fill more than one organizational role and wherein the computer server is further configured to generate a structure of the organization from the data defining the plurality of organizational relationships, the structure having a plurality of connected nodes, wherein roles are represented by nodes and relationships between these nodes are represented by connections between these nodes and wherein there is not a one-to-one correspondence of organizational roles to members of the organization; and
a plurality of network devices coupled to the computer server via a network wherein the data defining the plurality of organizational relationships is received from the network devices via the network and wherein the plurality of network devices are configured to display a visual representation of the structure.

36. The method according to claim 17, wherein the nodes representing each role of the particular individual are within different business units of the organization.

37. The method according to claim 18, further comprising providing a graphical user interface for navigating among the different positions in the structure of the organization that are represented by the nodes corresponding to each role of the particular individual.

38. A non-transitory computer readable media having stored thereon computer code which when executed by a processor causes the processor to perform a method of generating a visual representation of a structure of an organization of humans, the method comprising:
receiving data from a plurality of users, the data defining a plurality of organizational relationships between organizational roles to be undertaken by members of the organization, said receiving including at least receiving data from a first user defining a first organizational relationship between organizational roles and receiving data from a second user defining a second organizational relationship between organizational roles, and wherein at least one of the organizational roles is common to both the first and second organizational relationships, and wherein at least one of the organizational relationships so defined is hierarchical, and wherein the organizational roles can each be filled by a member of the organization or unfilled and wherein an individual member of the organization can fill more than one organizational role;
generating a structure of the organization from the data defining the plurality of organizational relationships, the structure having a plurality of connected nodes, wherein organizational roles are represented by nodes and relationships between these nodes are represented by connections between these nodes and wherein there is not a one-to-one correspondence of organizational roles to members of the organization; and
displaying a visual representation of the structure.

* * * * *